US012625093B2

(12) United States Patent
Zhang et al.

(10) Patent No.: US 12,625,093 B2
(45) Date of Patent: May 12, 2026

(54) RADIOGRAPHIC INSPECTION APPARATUS AND VEHICLE-MOUNTED SECURITY INSPECTION SYSTEM

(71) Applicants: NUCTECH COMPANY LIMITED, Haidian District (CN); Tsinghua University, Beijing (CN)

(72) Inventors: Li Zhang, Beijing (CN); Zhiqiang Chen, Beijing (CN); Qingping Huang, Beijing (CN); Mingzhi Hong, Beijing (CN); Yi Cheng, Beijing (CN); Minghua Qiu, Beijing (CN); Yao Zhang, Beijing (CN); Jianxue Yang, Beijing (CN); Lei Zheng, Beijing (CN)

(73) Assignees: NUCTECH COMPANY LIMITED, Beijing (CN); Tsinghua University, Beijing (CN)

( * ) Notice: Subject to any disclaimer, the term of this patent is extended or adjusted under 35 U.S.C. 154(b) by 264 days.

(21) Appl. No.: 18/284,598

(22) PCT Filed: Jan. 12, 2022

(86) PCT No.: PCT/CN2022/071544
§ 371 (c)(1),
(2) Date: Sep. 28, 2023

(87) PCT Pub. No.: WO2022/206109
PCT Pub. Date: Oct. 6, 2022

(65) Prior Publication Data
US 2024/0192151 A1     Jun. 13, 2024

(30) Foreign Application Priority Data

Mar. 30, 2021    (CN) .......................... 202110336807.2

(51) Int. Cl.
G01N 23/10          (2018.01)
G01N 23/04          (2018.01)
G01N 23/083         (2018.01)

(52) U.S. Cl.
CPC ............. *G01N 23/10* (2013.01); *G01N 23/04* (2013.01); *G01N 23/083* (2013.01)

(58) Field of Classification Search
CPC ...... G01N 23/04; G01N 23/083; G01N 23/10; G01N 2223/03; G01N 2223/1016
See application file for complete search history.

(56) References Cited

U.S. PATENT DOCUMENTS 11,259,763 B2    3/2022  Zhang et al.
2008/0192885 A1  8/2008  Teofilovic et al.
(Continued)

FOREIGN PATENT DOCUMENTS

CN      101470086 A    7/2009
CN      209608566 U    11/2019
(Continued)

OTHER PUBLICATIONS

CN-210652828-U Zheng, Xiong (Year: Jun. 2020).*
(Continued)

*Primary Examiner* — Jurie Yun
(74) *Attorney, Agent, or Firm* — Merchant & Gould P.C.

(57)          ABSTRACT

A radiographic inspection apparatus and a vehicle-mounted security inspection system. The radiographic inspection apparatus includes a scanning device. The scanning device includes: an upright framework; a slip ring rotatably provided on the upright framework; and at least one locking mechanism. Each locking mechanism includes: a driving mechanism provided on the upright framework; and a locking portion provided on the driving mechanism and configured to press the slip ring in an axial direction of the slip ring (Continued)

under a driving of the driving mechanism, so as to prevent the slip ring from rotating relative to the upright framework.

15 Claims, 25 Drawing Sheets

(56)                      References Cited

U.S. PATENT DOCUMENTS

| | | | |
|---|---|---|---|
| 2019/0298285 A1 | 10/2019 | Rakic et al. | |
| 2020/0205757 A1 | 7/2020 | Zhang et al. | |
| 2024/0151661 A1* | 5/2024 | Zhang | G01N 23/10 |

FOREIGN PATENT DOCUMENTS

| | | | |
|---|---|---|---|
| CN | 210652828 U | 6/2020 | |
| CN | 111374691 A | 7/2020 | |
| CN | 211355538 U | 8/2020 | |
| CN | 212145528 U | 12/2020 | |
| CN | 112730474 A | 4/2021 | |
| JP | 2002263096 A | 9/2002 | |
| JP | 2007252549 A | 10/2007 | |

OTHER PUBLICATIONS

CN-211355538-U PAN, Xian-feng (Year: Aug. 2020).*
International Search Report and Written Opinion for PCT application No. PCT/CN2022/071544 dated Mar. 30, 2022 (8 pages).
English Translation of International Search Report or PCT application No. PCT/CN2022/071544 dated Mar. 30, 2022 (3 pages).
First Office Action issued on May 12, 2021 for Chinese application No. 202110336807.2 (17 pages including English Translation).
Second Office Action issued on Jun. 9, 2021 for Chinese application No. 202110336807.2 (15 pages including English Translation).
Third Office Action issued on Jul. 7, 2021 for Chinese application No. 202110336807.2 (17 pages including English Translation).

* cited by examiner

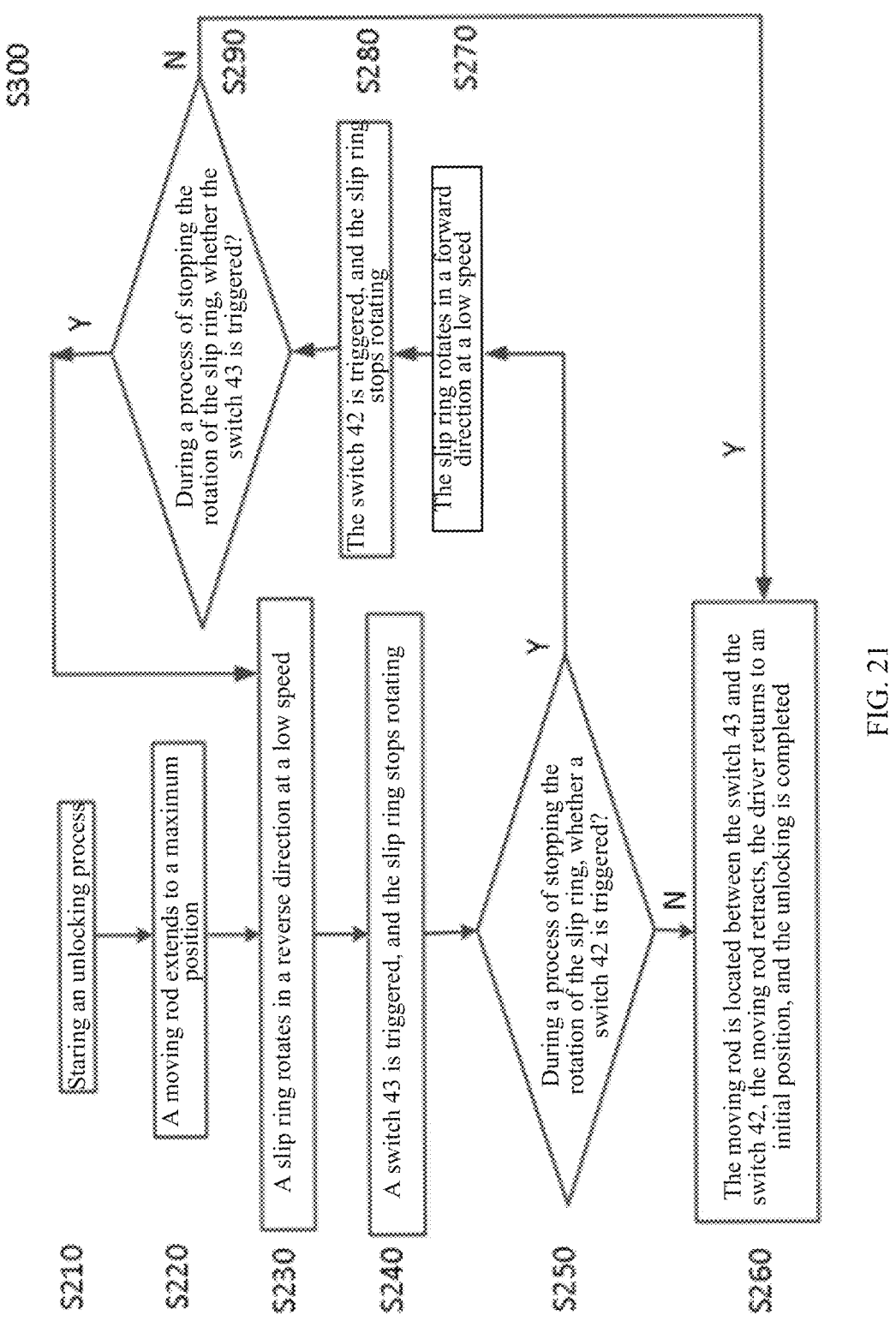

S210 Staring an unlocking process

S220 A moving rod extends to a maximum position

S230 A slip ring rotates in a reverse direction at a low speed

S240 A switch 43 is triggered, and the slip ring stops rotating

S250 During a process of stopping the rotation of the slip ring, whether a switch 42 is triggered?

S260 The moving rod is located between the switch 43 and the switch 42, the moving rod retracts, the driver returns to an initial position, and the unlocking is completed S290 During a process of stopping the rotation of the slip ring, whether the switch 43 is triggered?

S280 The switch 42 is triggered, and the slip ring stops rotating

S270 The slip ring rotates in a forward direction at a low speed

RADIOGRAPHIC INSPECTION APPARATUS AND VEHICLE-MOUNTED SECURITY INSPECTION SYSTEM

CROSS-REFERENCE TO RELATED APPLICATION(S)

This application is a National Stage Application of International Application No. PCT/CN2022/071544, filed 12 Jan. 2022, which claims the benefit of Ser. No. 20/211, 0336807.2, filed 30 Mar. 2021 in China, and which applications are incorporated herein by reference. To the extent appropriate, a claim of priority is made to each of the above disclosed applications.

TECHNICAL FIELD

Embodiments of the present disclosure relate to a vehicle-mounted security inspection system, and in particular, to a radiographic inspection apparatus and a movable vehicle-mounted security inspection system including the radiographic inspection apparatus.

BACKGROUND

Based on requirements of public safety, a vehicle-mounted security inspection system is often used to perform a non-invasion inspection on an object such as a luggage or a package in large public places, such as large-scale exhibitions, temporary highway inspection stations, border inspection ports or stadiums. For example, a radiographic inspection apparatus provided in a vehicle is used to inspect whether a prohibited item such as a drug or an explosive exists in the object or not. An object to be inspected passes through an inspection space of the radiographic inspection apparatus by means of a conveying structure, and an X-ray emission apparatus emits X-rays into a radiographic channel, so as to achieve an inspection of the object.

In an existing vehicle-mounted security inspection system, a radiographic inspection apparatus is directly provided in a box of the vehicle. The radiographic examination apparatus generally includes a housing and a scanning device (CT machine) provided in the housing. The scanning device mainly includes a supporting frame, a slip ring rotatably provided on the supporting frame, a radiation source used to emit X-rays provided on the slip ring, a detector array provided on a side of the slip ring opposite to the radiation source, and a conveying structure passing through an approximate center of the slip ring. As the radiographic inspection apparatus is provided in the box of the vehicle, if the radiographic inspection apparatus is not operating while the vehicle is traveling, the slip ring may rotate due to vibration, which may cause a damage to the slip ring.

SUMMARY

The purpose of the present disclosure is to solve at least one aspect of the above problems and defects in related art.

According to an embodiment of an aspect of the present disclosure, a radiographic inspection apparatus is provided, including: a scanning device, where the scanning device includes: an upright framework; a slip ring rotatably provided on the upright framework; and at least one locking mechanism, each locking mechanism including: a driving mechanism provided on the upright framework, and a locking portion provided on the driving mechanism and configured to press the slip ring in an axial direction of the slip ring under a driving of the driving mechanism, so as to prevent the slip ring from rotating relative to the upright framework.

According to an embodiment of the present disclosure, each locking portion includes: a moving rod connected to the driving mechanism, where an end of the moving rod away from the driving mechanism is provided with a suspension portion, and the suspension portion protrudes radially and is configured to pull the slip ring in the axial direction.

According to an embodiment of the present disclosure, the slip ring is provided with at least one joint portion, and the at least one joint portion extends from an outer ring of the slip ring in a radial direction, and the suspension portion of the moving rod is configured to pull the joint portion in the axial direction.

According to an embodiment of the present disclosure, a locking groove is formed on the joint portion and has an opening in a circumferential direction of the slip ring, and a width of the locking groove is greater than an outer diameter of the moving rod. The suspension portion is formed as a locking flange, and an outer diameter of the locking flange is greater than the width of the locking groove, so that the moving rod is allowed to enter the locking groove from the opening, and the locking flange abuts against an edge of the locking groove.

According to an embodiment of the present disclosure, the driving mechanism includes: a base provided on the upright framework; and a driver provided on the base, wherein the moving rod is configured to reciprocate linearly in the axial direction under a driving of the driver.

According to an embodiment of the present disclosure, the driving mechanism further includes: an auxiliary base provided on the base and configured to reciprocate linearly in the axial direction, where the driver is provided on the auxiliary base; and a supporting frame, where the moving rod movably passes through the supporting frame.

According to an embodiment of the present disclosure, the base is provided with a termination position, and a movement range of the auxiliary base away from the slip ring does not exceed the termination position. The driving mechanism further includes a resilient mechanism provided between the auxiliary base and the supporting frame, and where when the slip ring is in a released state in which the suspension portion releases the slip ring, the resilient mechanism is configured to maintain the auxiliary base at the termination position, and when the slip ring is in a locked state in which the suspension portion locks the slip ring, the auxiliary base overcomes a resilient force of the resilient mechanism to leave the termination position.

According to an embodiment of the present disclosure, a first proximity switch is provided at the termination position, and a first matching switch is provided on the auxiliary base, so as to detect whether the first matching switch leaves the first proximity switch or not.

According to an embodiment of the present disclosure, the auxiliary base is provided on the base through a guide rail mechanism.

According to an embodiment of the present disclosure, the upright framework is provided with a second matching switch, the slip ring is provided with a second proximity switch, and the driver is configured to drive the moving rod to lock the slip ring in response to the second proximity switch approaching the second matching switch.

According to an embodiment of the present disclosure, the slip ring is further provided with a third proximity switch, the third proximity switch is disposed at a downstream of the second proximity switch in a forward rotation direction of the slip ring, and a position of the third proximity switch corresponds to a position near an exterior of the opening of each locking groove.

According to an embodiment of the present disclosure, the slip ring is further provided with a fourth proximity switch, the fourth proximity switch is disposed at a downstream of the third proximity switch in the forward rotation direction of the slip ring, and the locking mechanism is configured to start a locking process for locking the slip ring in response to the fourth proximity switch approaching the second matching switch.

According to an embodiment of another aspect of the present disclosure, a vehicle-mounted security inspection system is provided, including: a vehicle; and a radiographic inspection apparatus according to any one of the above embodiments provided on a chassis of the vehicle.

According to an embodiment of the present disclosure, the chassis includes: a main body portion; and a horizontal framework integrally connected with the main body portion, where the horizontal framework includes a pair of longitudinal supporting beams and a pair of lateral supporting frames, the upright framework is provided on one of the longitudinal supporting beam or the lateral supporting beam, and at least part of the upright framework is lower than an upper surface of the horizontal framework.

According to an embodiment of the present disclosure, the upright framework is provided on the horizontal framework through two groups of connecting mechanisms. Each group of connecting mechanisms includes a horizontal arm extending outward from an outer side of the upright framework and supported on the longitudinal supporting beam or the lateral supporting beam.

According to an embodiment of the present disclosure, each group of connecting mechanisms further includes an upright arm provided on the outer side of the upright framework, and the horizontal arm is connected to a lower end of the upright arm.

According to an embodiment of the present disclosure, the two groups of connecting mechanisms are provided on both sides of the upright framework, respectively, and located between a lower end of the upright framework and an upper end of the upright framework, so that at least part of the upright framework is lower than an upper surface of the horizontal framework.

According to an embodiment of the present disclosure, a height of the main body portion from a ground is greater than a height of the horizontal framework from the ground.

4

Figure 4:
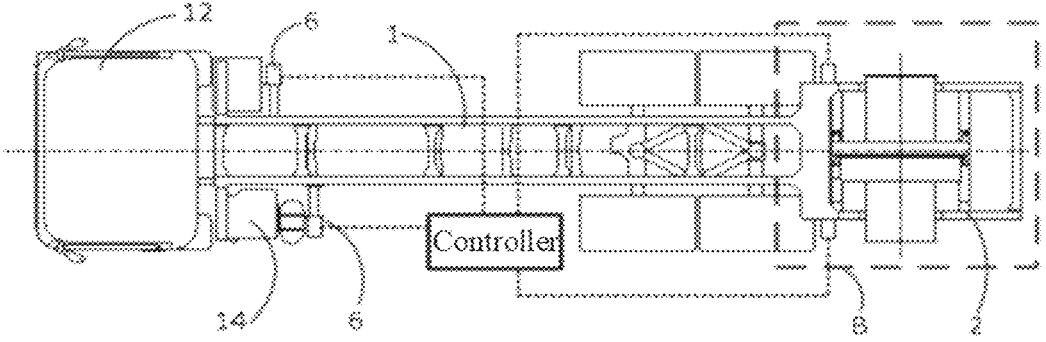
FIG. 4 shows a top view of the vehicle-mounted security inspection system shown in FIG. 2.
Figure 5:
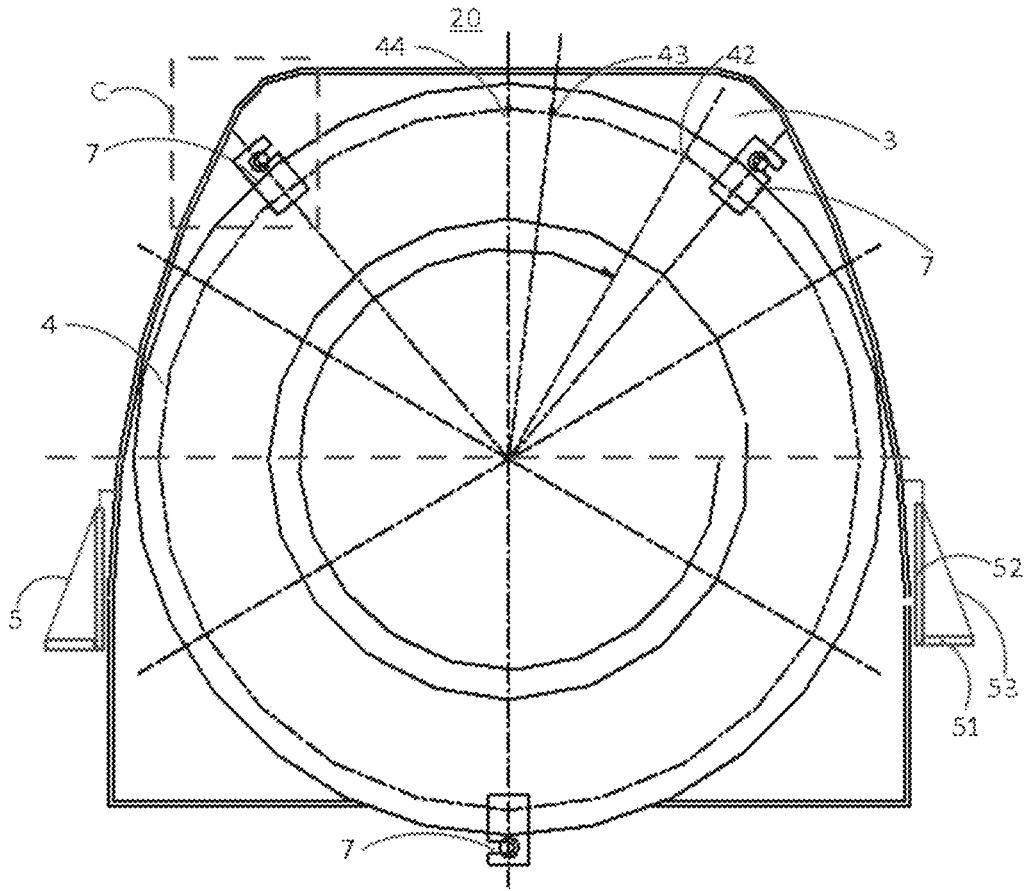
FIG. 5 shows a simplified front view of a radiographic inspection apparatus of an exemplary embodiment of the present disclosure.
Figure 7:
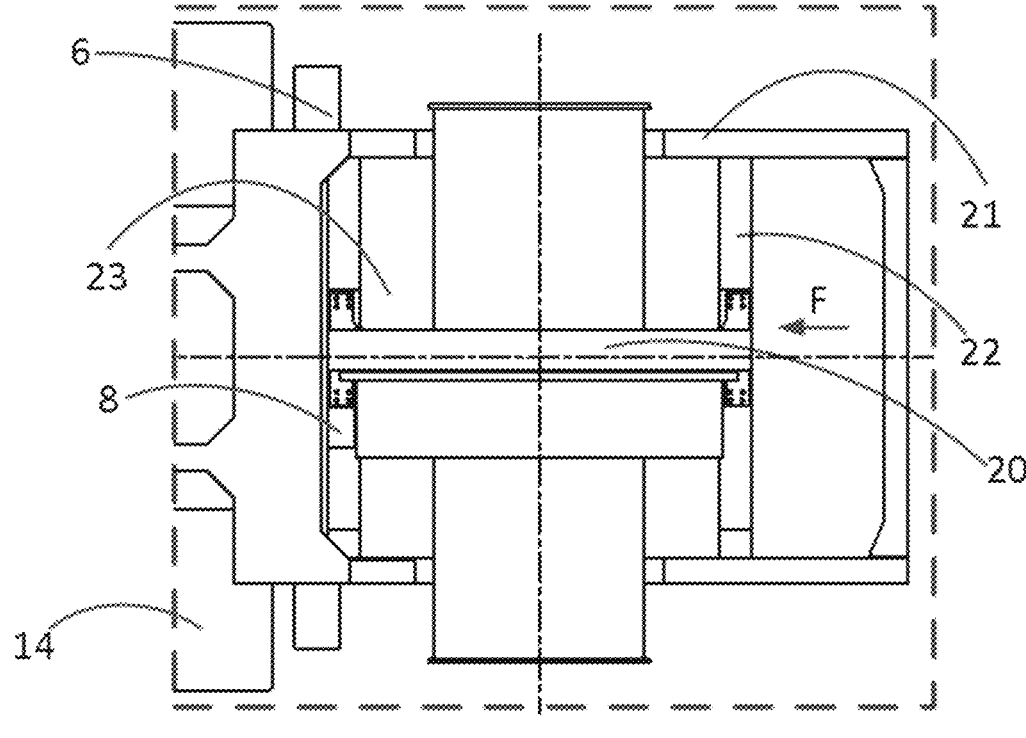
Figure 8:
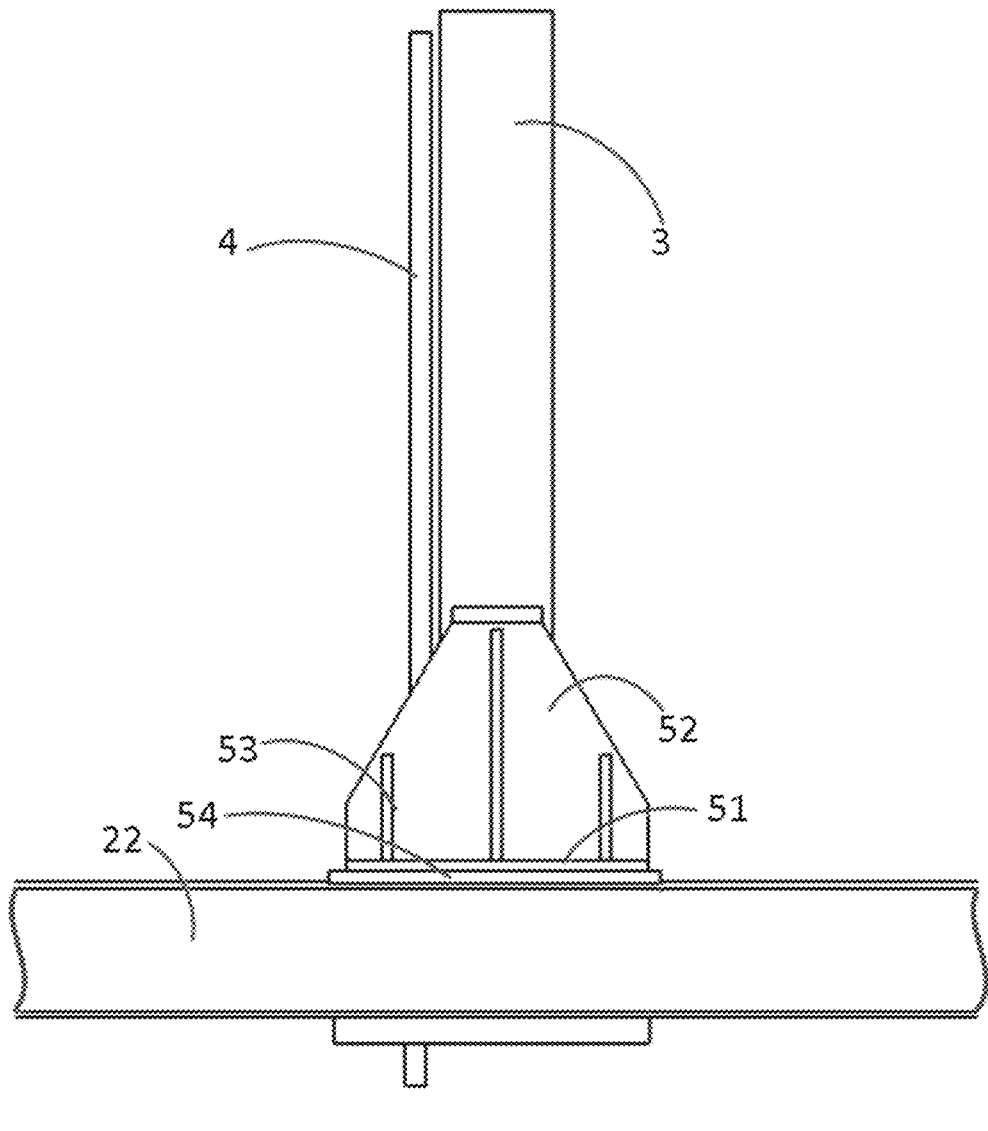
Figure 9:
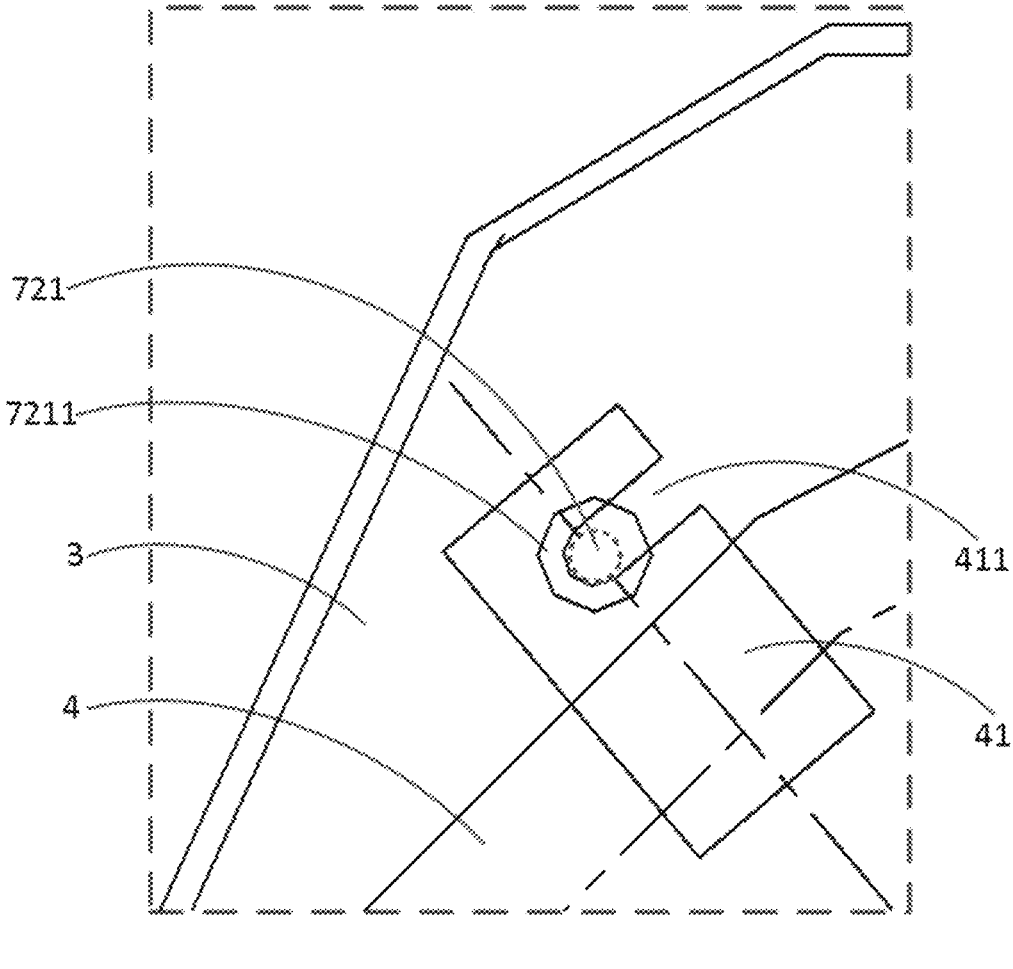
Figure 10:
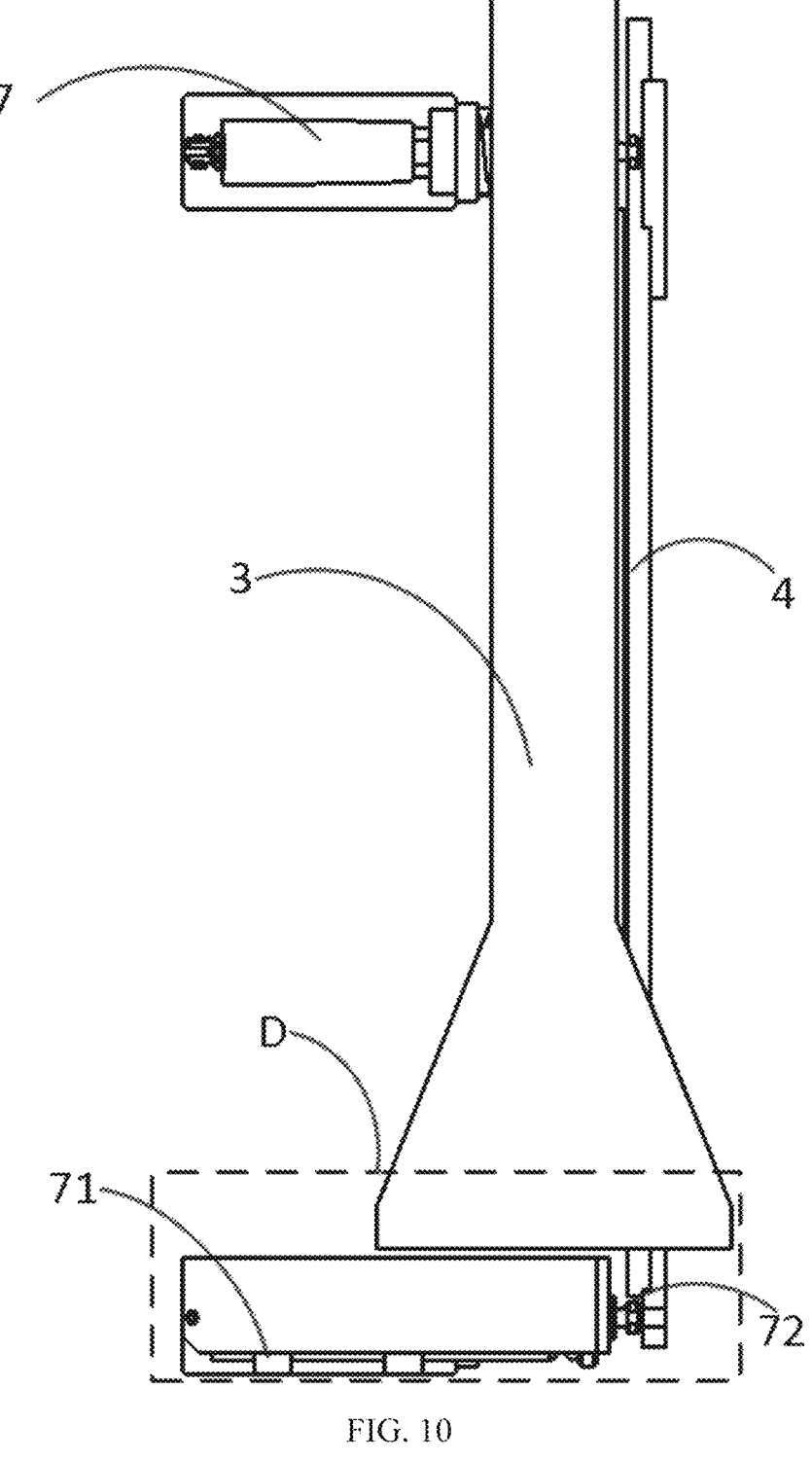
Figure 11:
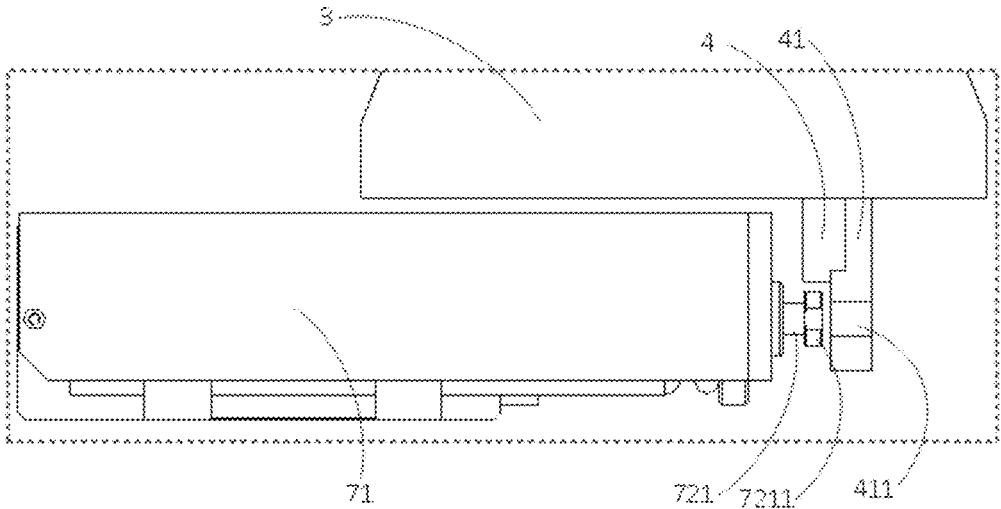
Figure 12:
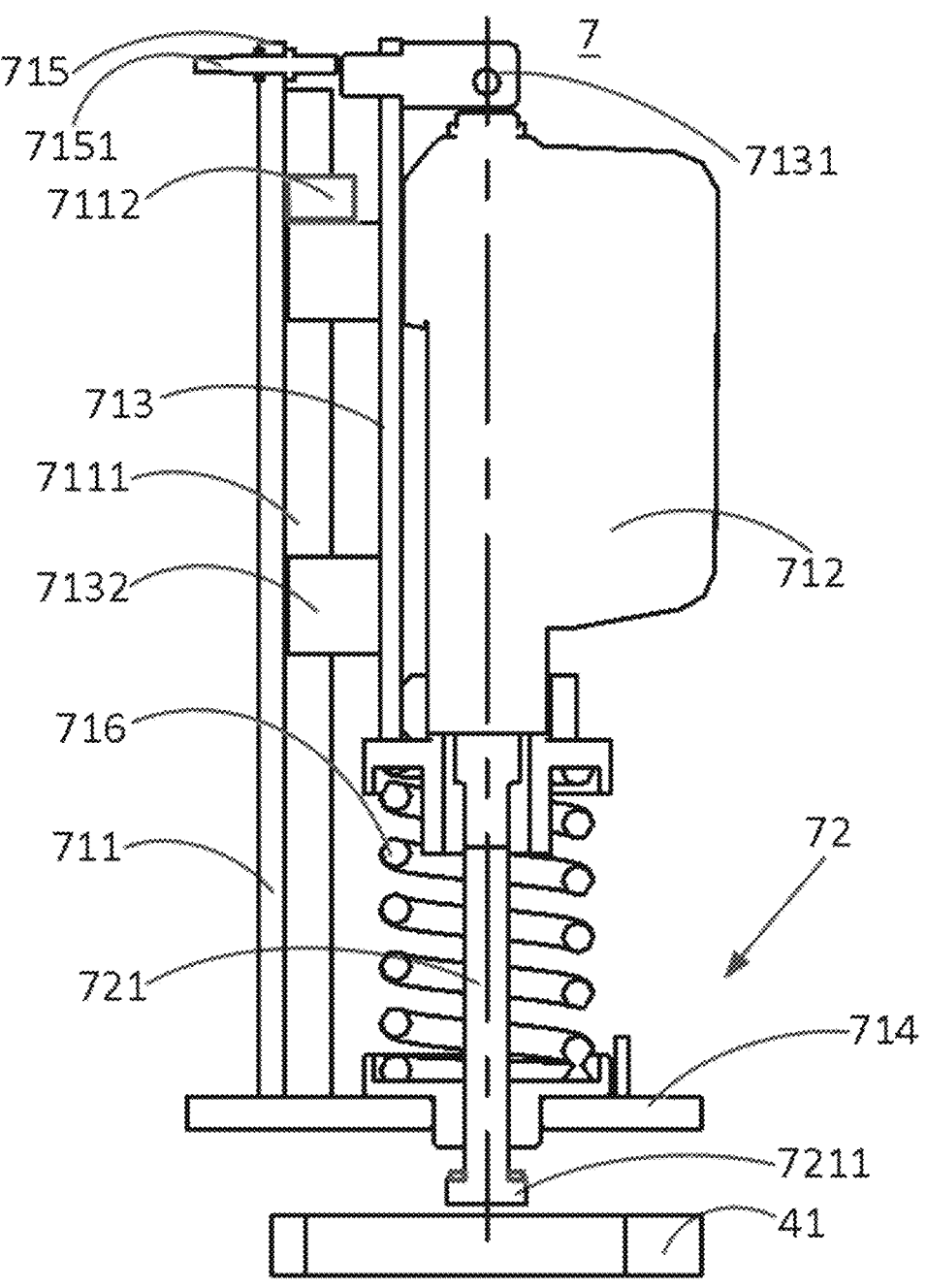
Figure 13:
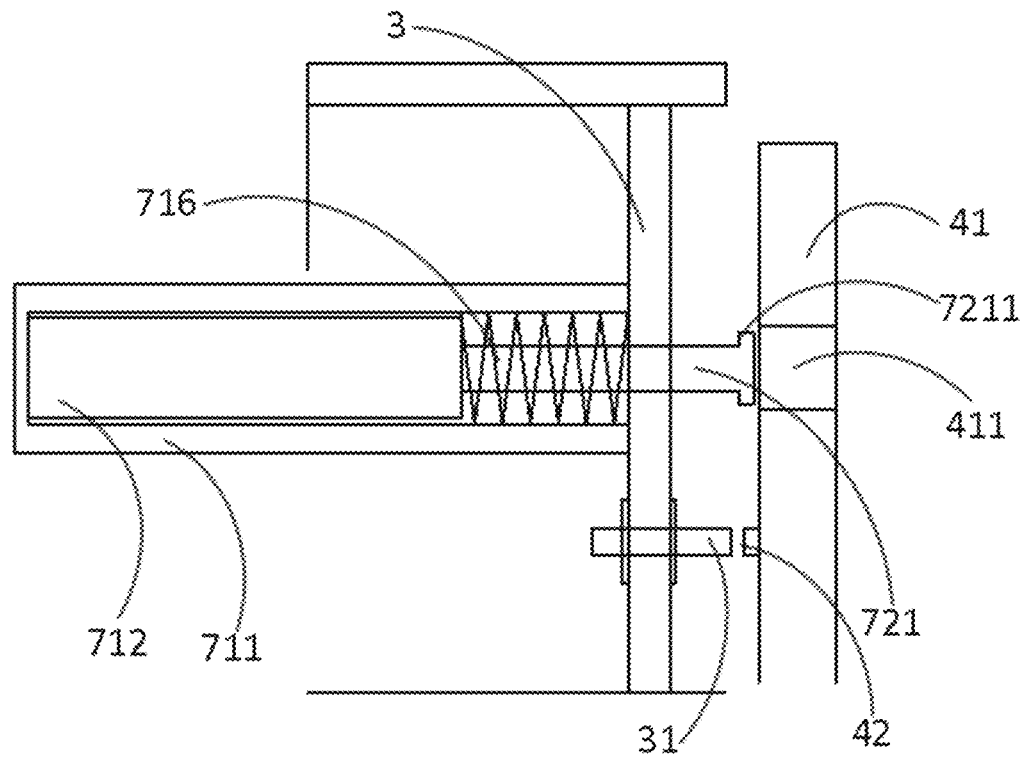
Figure 14:
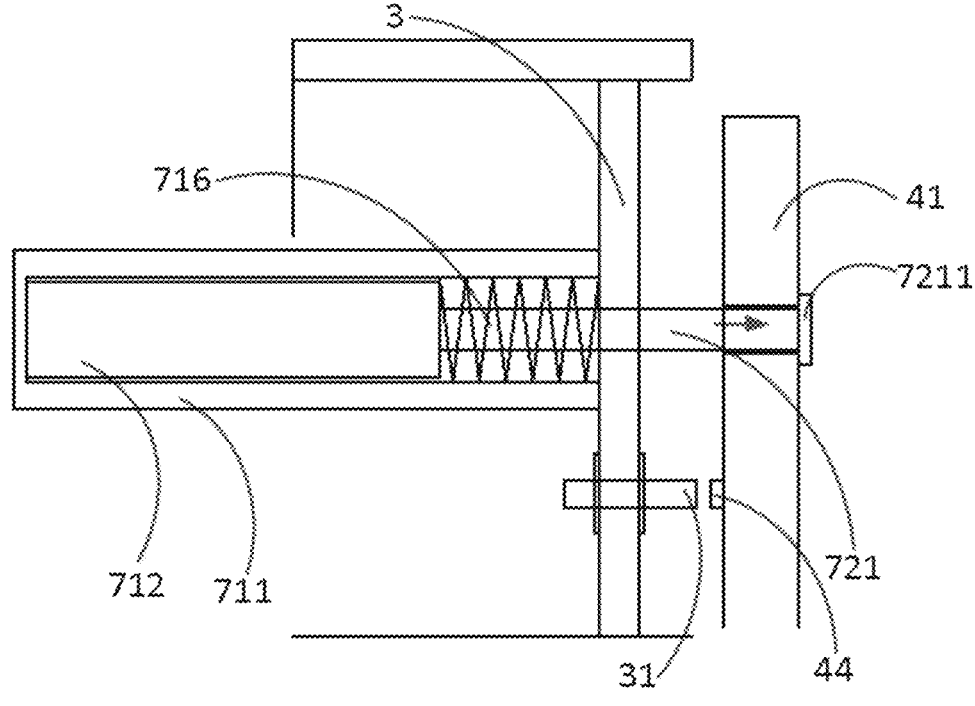
Figure 15:
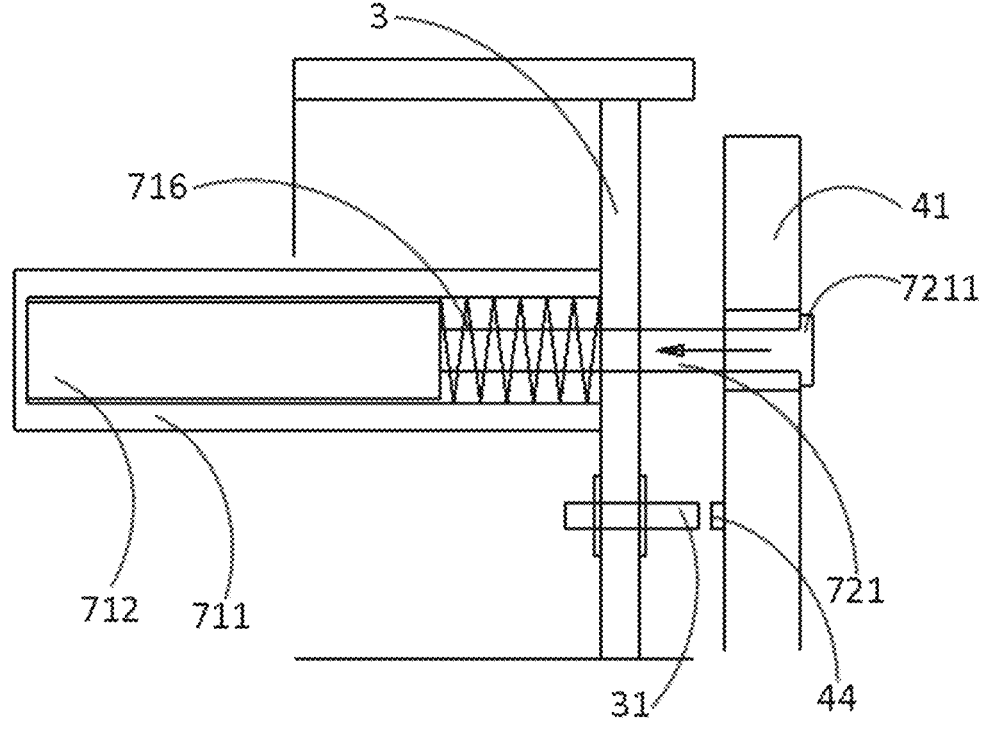
Figure 16:
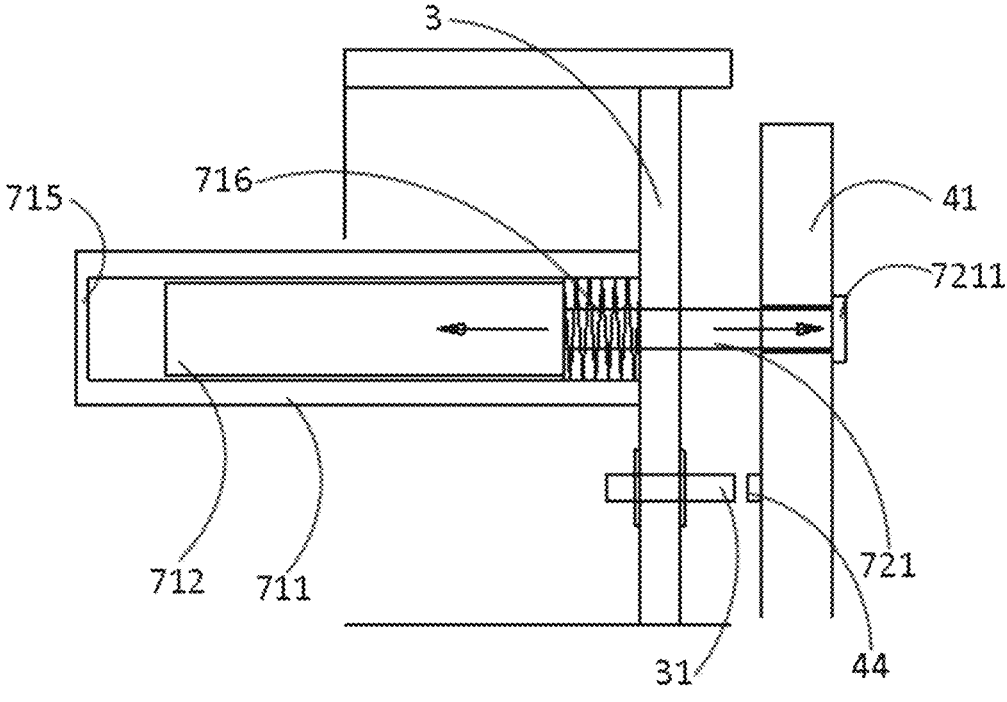
Figure 17:
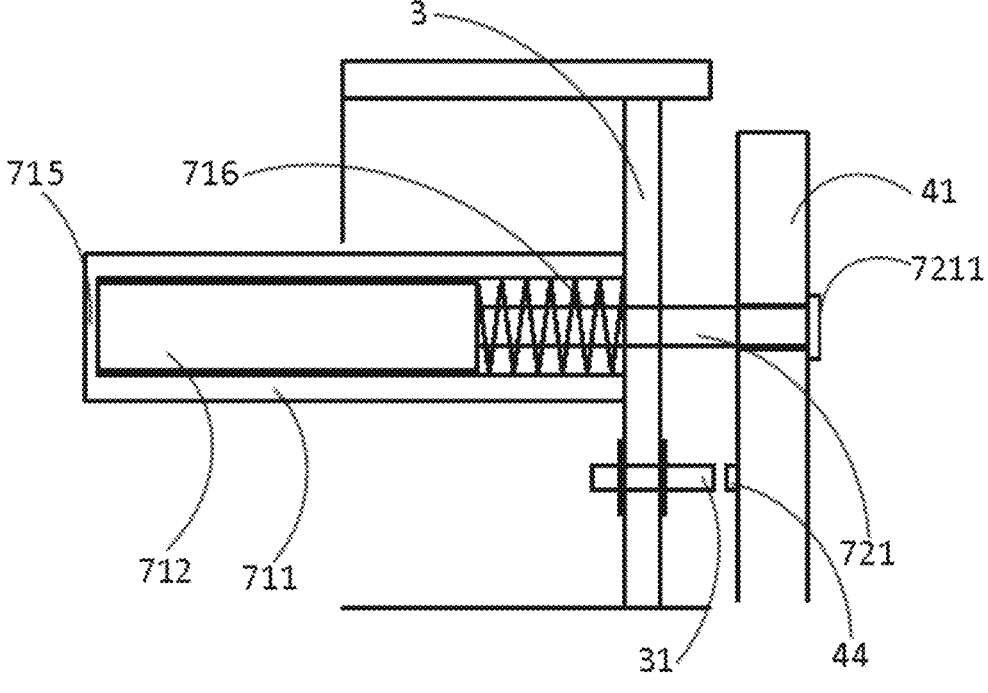
Figure 18:
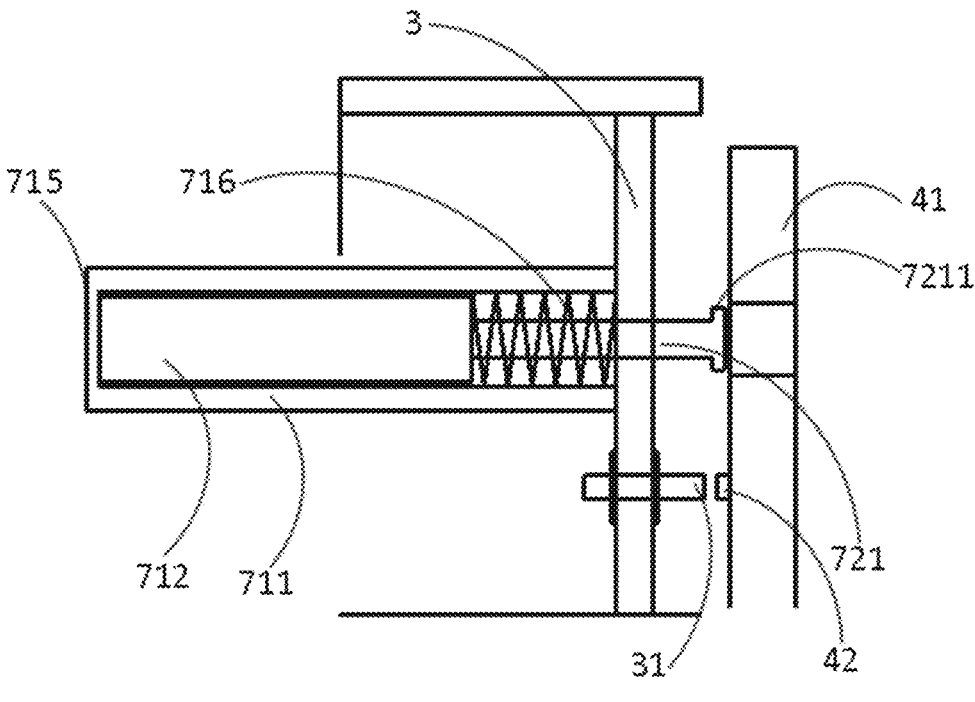
Figure 19:
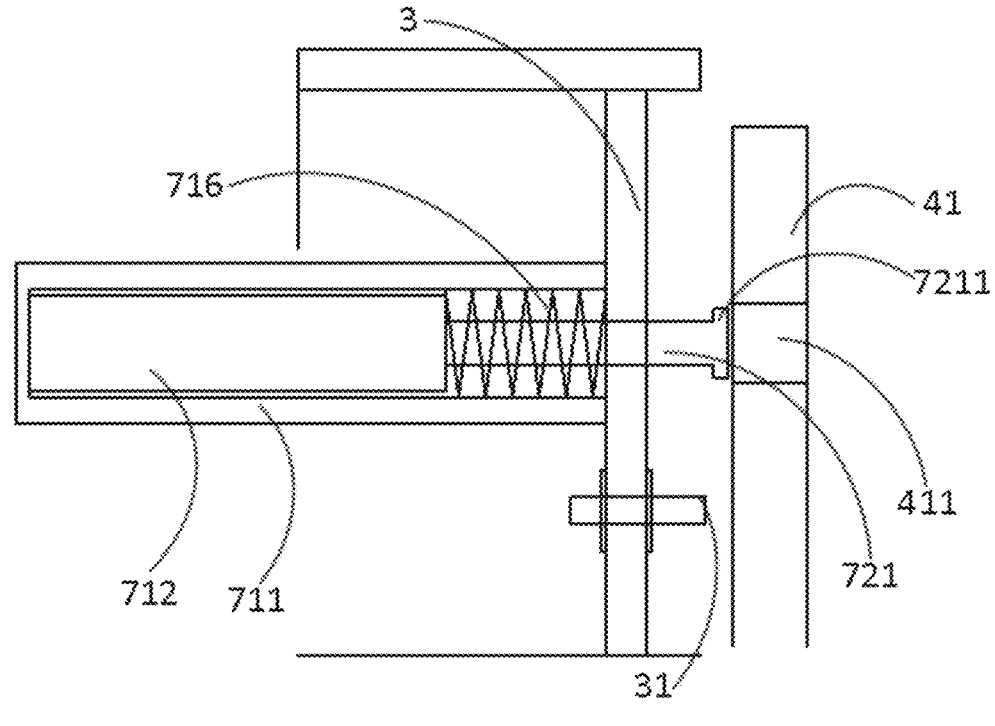
Figure 20:
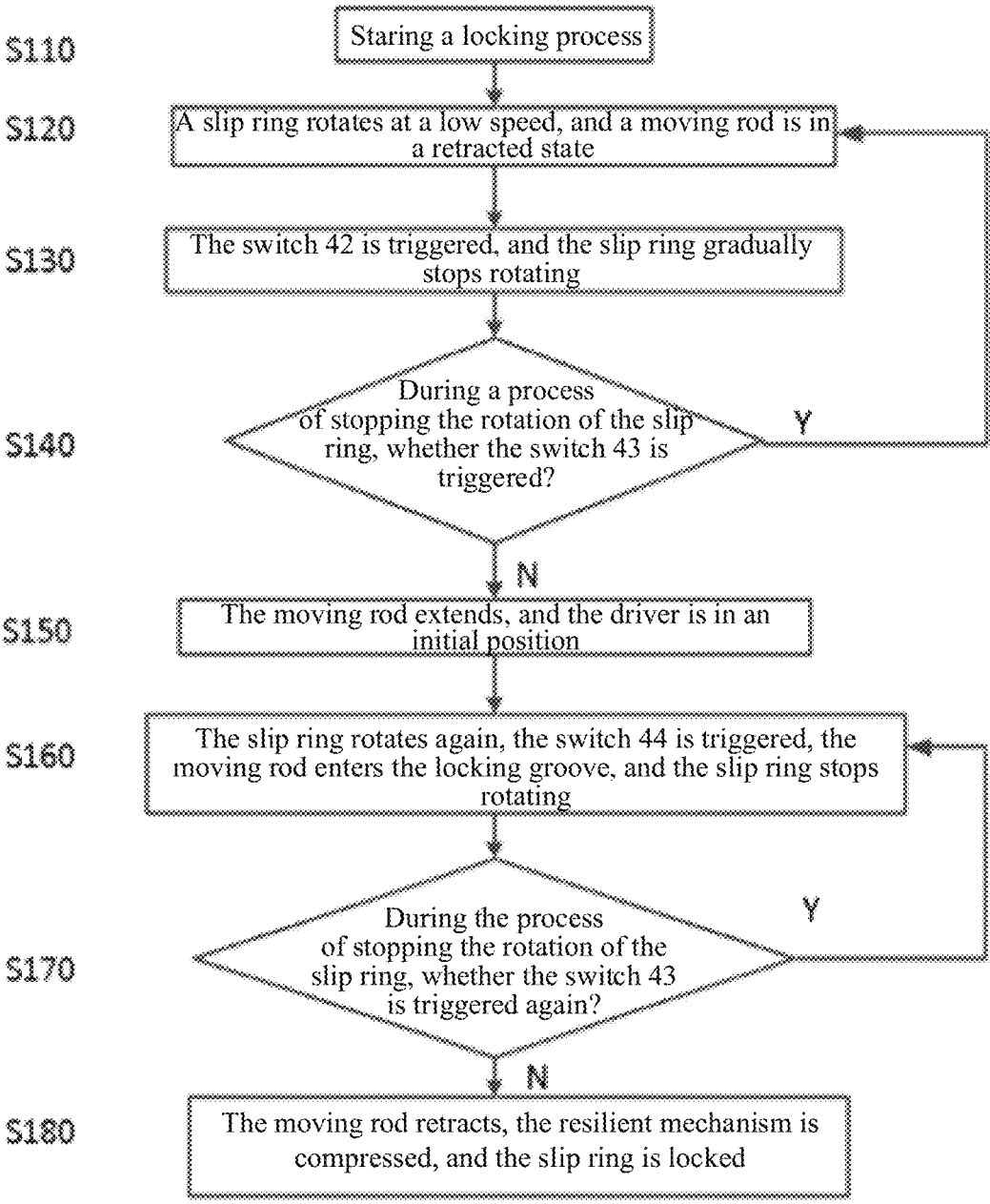
Figure 22:
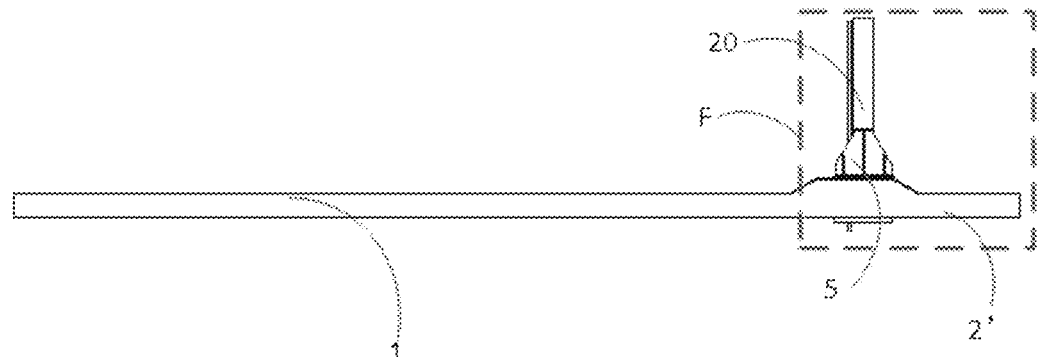
Figure 23:
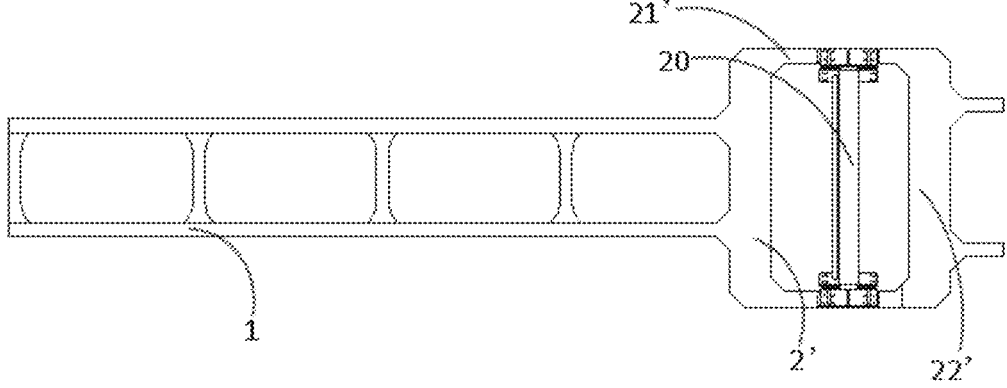
Figure 24:
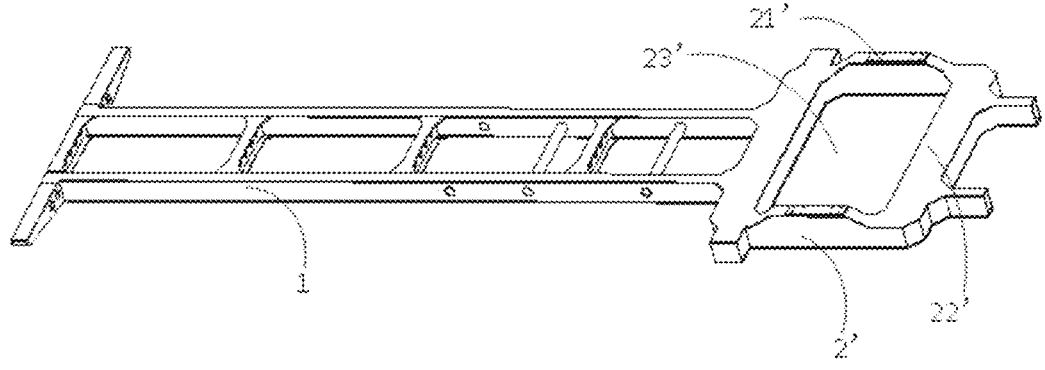
Figure 25:
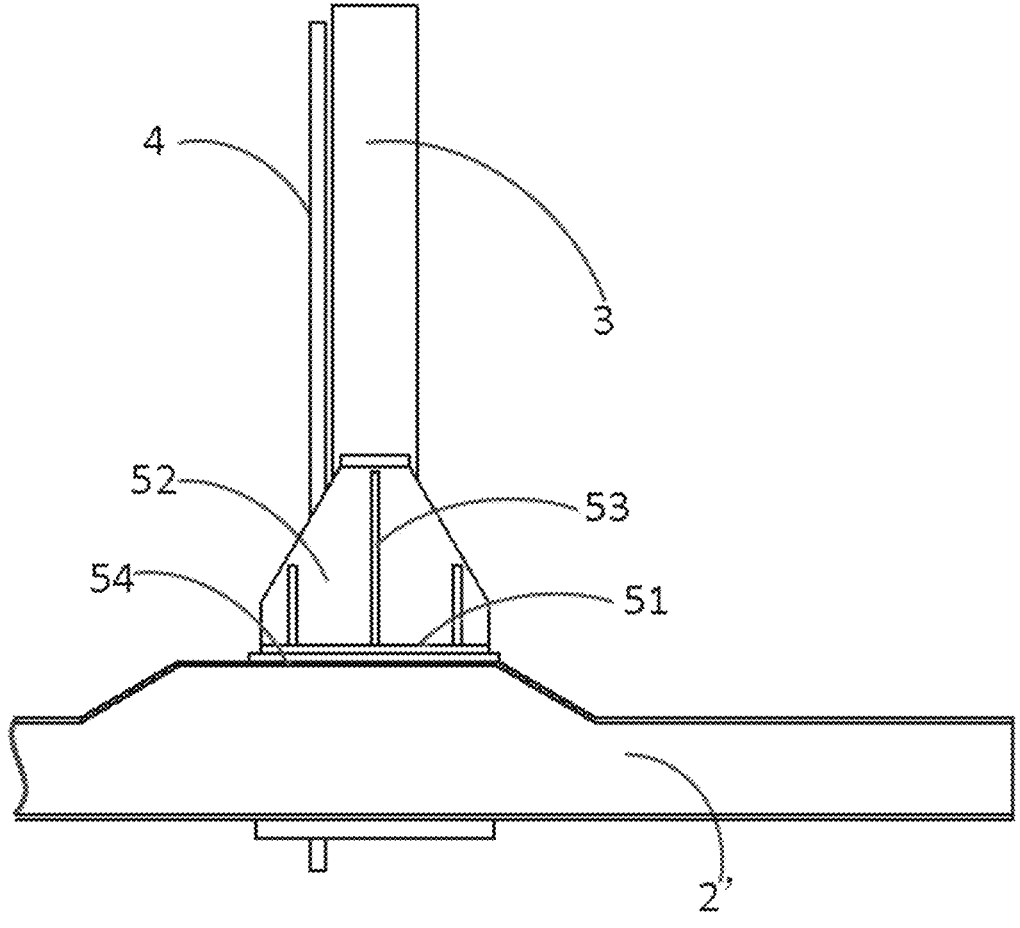

FIG. 7 shows an enlarged schematic diagram of part B shown in FIG. 4;

FIG. 8 shows a partial rear view viewed from position F in FIG. 7;

FIG. 9 shows an enlarged schematic diagram of part C shown in FIG. 5;

FIG. 10 shows a side view of FIG. 5 without showing a connecting mechanism;

FIG. 11 shows an enlarged schematic diagram of part D shown in FIG. 10;

FIG. 12 shows a simplified schematic diagram of a locking mechanism of a radiographic inspection apparatus of an exemplary embodiment of the present disclosure;

FIG. 13 shows a simplified schematic diagram of a locking mechanism in an unlocked state;

FIG. 14 is a simplified schematic diagram showing that a moving rod of the locking mechanism extends into a locking groove of a joint portion based on FIG. 13;

FIG. 15 is a simplified schematic diagram showing that the moving rod of the locking mechanism is about to tightly pull the joint portion based on FIG. 14;

FIG. 16 is a simplified schematic diagram showing that the moving rod of the locking mechanism tightly pulls the joint portion and locks a slip ring based on FIG. 15;

FIG. 17 is a simplified schematic diagram showing that the moving rod of the locking mechanism releases the joint portion based on FIG. 16;

FIG. 18 is a simplified schematic diagram showing that the moving rod of the locking mechanism moves out of a locking groove of the joint portion and is in an unlocked state based on FIG. 17;

FIG. 19 is a simplified schematic diagram showing that the slip ring rotates freely in the unlocked state based on FIG. 18;

FIG. 20 shows a flowchart of an operation of a locking mechanism locking a slip ring;

FIG. 21 shows a flowchart of an operation of a locking mechanism unlocking a slip ring;

FIG. 22 shows a simplified side view of an interior of a vehicle-mounted security inspection system of another exemplary embodiment of the present disclosure;

FIG. 23 shows a top view of the vehicle-mounted security inspection system shown in FIG. 22;

FIG. 24 shows a three-dimensional schematic diagram of a chassis of the vehicle-mounted security inspection system shown in FIG. 22; and FIG. 25 shows an enlarged schematic diagram of part E shown in FIG. 22.

DETAILED DESCRIPTION OF EMBODIMENTS

With reference to accompanying drawings in embodiments of the present disclosure, the technical solution in embodiments of the present disclosure will be described clearly and completely. It is clear that embodiments described are some embodiments of the present disclosure, rather than all embodiments. The description of at least one exemplary embodiment below is actually only explanatory, and it will never be used as any limitation on the present disclosure and its application or use. Based on embodiments in the present disclosure, all other embodiments derived by those of ordinary skill in the art without creative work fall within the scope of protection of the present disclosure.

In the following detailed descriptions, for purposes of explanation, many specific details are elaborated to provide a comprehensive understanding of embodiments of the present disclosure. However, it is clear that one or more embodiments may be implemented without these specific details. In other cases, well-known structures and devices are illustrated to simplify the accompanying drawings. It may not be discussed in details about technologies, methods and devices known by those of ordinary skill in the art in related fields, but in an appropriate case, the technologies, methods and devices should be regarded as a part of the granted description.

In the description of the present disclosure, it should be understood that an orientation or position relationship indicated by terms such as "front, back, up, down, left, right", "lateral, longitudinal, vertical, horizontal" and "top, bottom" and other positions is based on an orientation or position relationship shown in the drawings and a travelling direction of a vehicle, and is used for the convenience of describing the present disclosure and simplifying the description. Unless otherwise stated, these orientation terms do not indicate and imply devices or elements referred to that must have a specific orientation or be constructed and operated in a specific orientation, so it should not be understood as a limitation on the scope of protection of the present disclosure. The orientation term "inside" or "outside" refers to an inside or an outside relative to a contour of a component itself.

In the description of the present disclosure, it should be understood that it is to facilitate differences in corresponding parts, by using terms "first" and "second" to define parts. Unless otherwise stated, the above terms have no special meaning, which should not be understood as a limitation on the scope of protection of the present disclosure.

According to a general concept of the present disclosure, a radiographic inspection apparatus is provided, including: a scanning device. The scanning device includes an upright framework; a slip ring rotatably provided on the upright framework; and at least one locking mechanism. Each locking mechanism includes: a driving mechanism provided on the upright framework; and a locking portion, where the locking portion is provided on the driving mechanism and used to press the slip ring in an axial direction of the slip ring under a driving of the driving mechanism, so as to prevent the slip ring from rotating relative to the upright framework.

According to another general concept of the present disclosure, a vehicle-mounted security inspection system is provided, including: a vehicle; and the above-mentioned radiographic inspection apparatus provided on a chassis of the vehicle.

Figure 1:
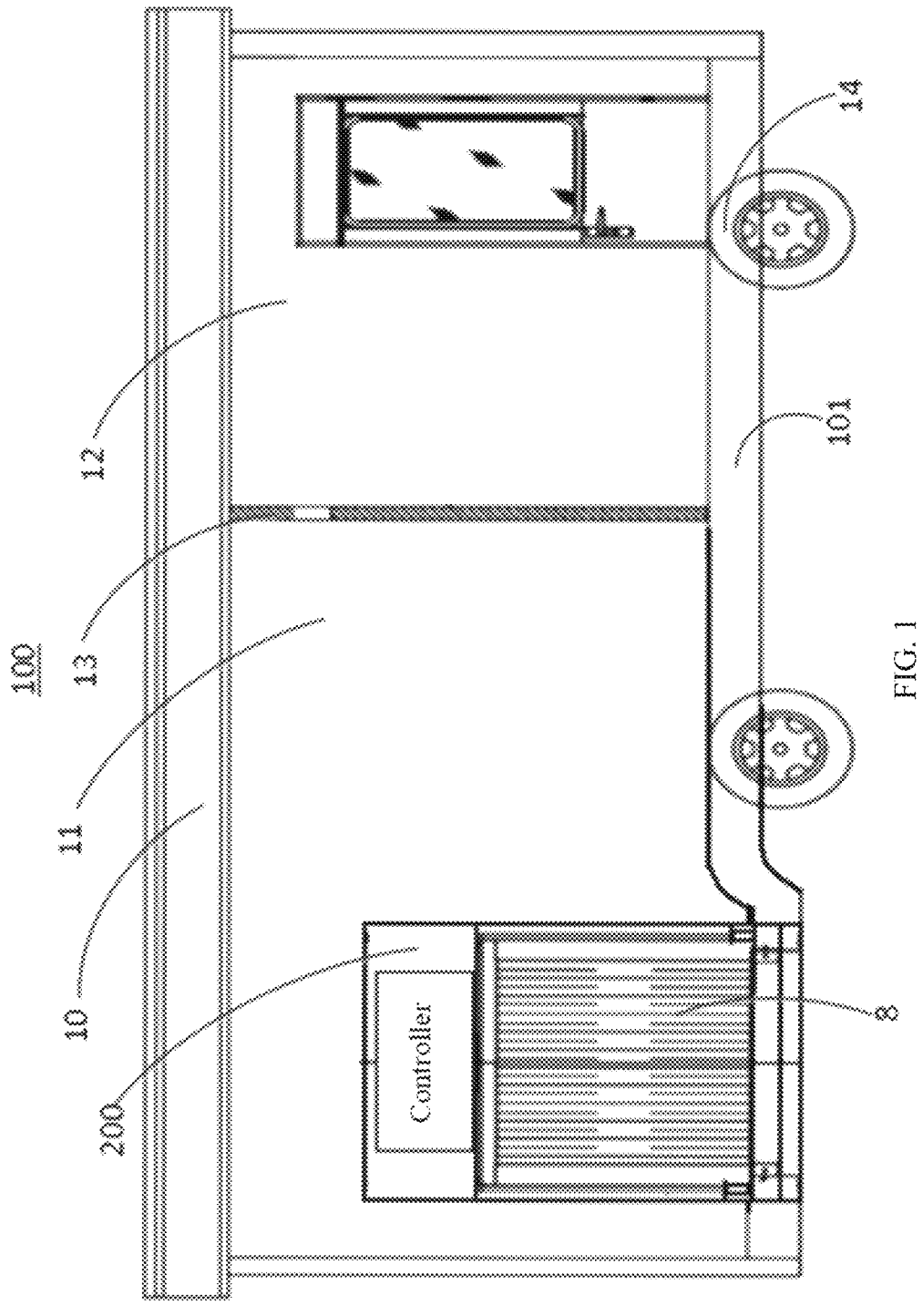
FIG. 1 shows a side view of a vehicle-mounted security inspection system of an exemplary embodiment of the present disclosure.
Figure 2:
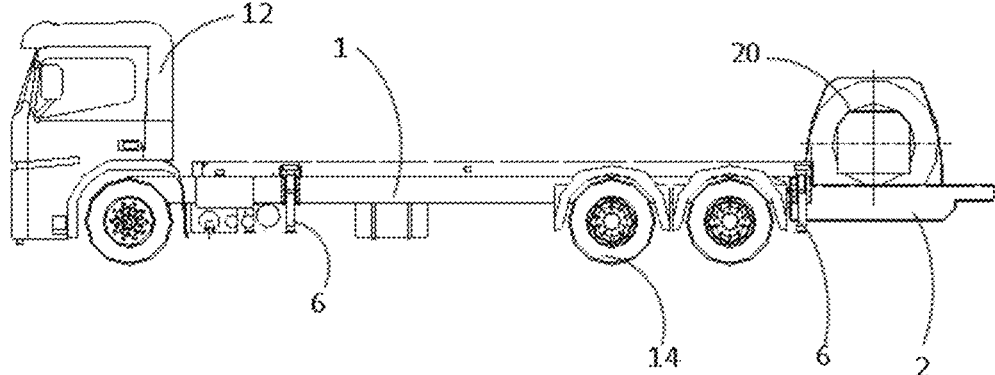
FIG. 2 shows a simplified side view of an interior of the vehicle-mounted security inspection system shown in FIG. 1.
Figure 3:
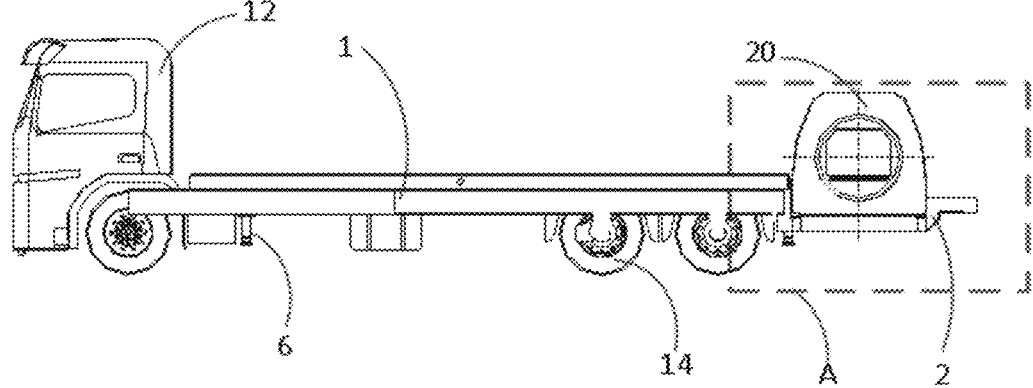
FIG. 3 shows a partial longitudinal cross-sectional view of the vehicle-mounted security inspection system shown in FIG. 2.

FIG. 1 shows a side view of a vehicle-mounted security inspection system of an exemplary embodiment of the present disclosure. FIG. 2 shows a simplified side view of an interior of the vehicle-mounted security inspection system shown in FIG. 1. FIG. 3 shows a partial longitudinal cross-sectional view of the vehicle-mounted security inspection system shown in FIG. 2. FIG. 4 shows a top view of the vehicle-mounted security inspection system shown in FIG. 2.

In an exemplary embodiment, with reference to FIGS. 1 to 4, a vehicle-mounted security system 100 is used to inspect whether a prohibited item such as a drug and an explosive exists in luggage, packages, handbags or other objects in places with high mobility of people such as stations, airports, stadiums or shopping malls. The vehicle-mounted security inspection system 100 includes a vehicle 10 and a scanning device 20 of a radiographic inspection apparatus 200 provided on the vehicle. The vehicle 10 includes a chassis 101, a box 11 provided on the chassis, a driving room 12, a partition 13 used to separate the driving room 12 and the box 11, and wheels 14 provided on a lower portion of the chassis.

Figure 6:
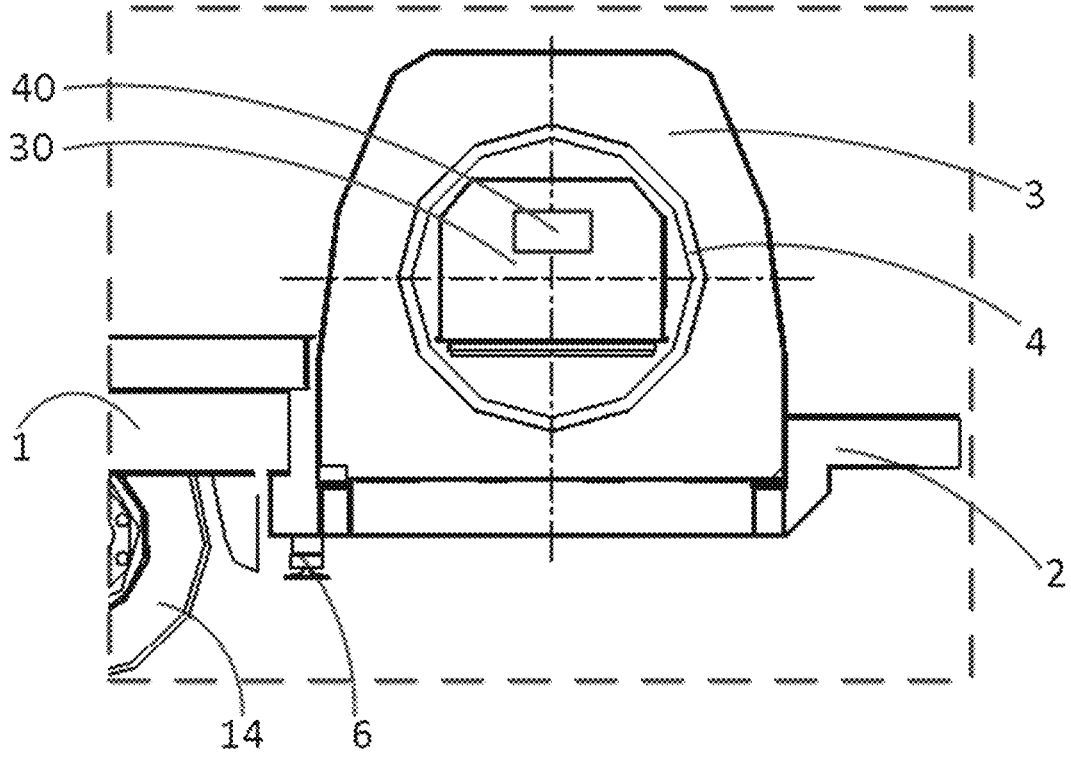
FIG. 6 shows an enlarged schematic diagram of part A shown in FIG. 3.

FIG. 5 shows a simplified front view of a radiographic inspection apparatus of an exemplary embodiment of the present disclosure. FIG. 6 shows an enlarged schematic diagram of part A shown in FIG. 3. FIG. 7 shows an enlarged schematic diagram of part B shown in FIG. 4. FIG. 8 shows a partial rear view viewed from position F in FIG. 7.

In an exemplary embodiment, with reference to FIGS. 1 to 8, the radiographic inspection apparatus 200 includes: a radiation source (not shown) used to emit X-rays and a detector array (not shown) used to receive X-rays located on opposite sides of the slip ring 4, a conveying structure 30 used to carry an object 40 to move through the slip ring 4, and a shielding curtain 8 provided at an entrance and an exit of the radiographic inspection apparatus. The radiographic inspection apparatus 200 further includes a controller used to receive electrical signals from various sensors and control operations of related devices (such as radiation sources, driving mechanisms, etc.) of the radiographic inspection apparatus.

FIG. 9 shows an enlarged schematic diagram of part C shown in FIG. 5. FIG. 10 shows a side view of FIG. 5 without showing a connecting mechanism. FIG. 11 shows an enlarged schematic diagram of part D shown in FIG. 10. FIG. 12 shows a simplified schematic diagram of a locking mechanism of a radiographic inspection apparatus of an exemplary embodiment of the present disclosure. FIG. 13 shows a simplified schematic diagram of a locking mechanism in an unlocked state.

In an exemplary embodiment, with reference to FIGS. 5, 9 to 12, the radiographic inspection apparatus 200 includes a scanning device 20. The scanning device 20 includes: an upright framework 3; a slip ring 4 rotatably provided on the upright framework 3; and three locking mechanisms 7. Each locking mechanism 7 includes: a driving mechanism 71 provided on the upright framework 3; and a locking portion 72. The locking portion 72 is provided on the driving mechanism 71 and is used to press the slip ring 4 in an axial direction of the slip ring 4 under a driving of the driving mechanism 71, so as to prevent the slip ring 4 from rotating relative to the upright framework 3. In this way, during an idle state of the scanning device 20, the locking mechanism 7 locks the slip ring 4 to prevent the slip ring 4 from rotating, so as to prevent key components of the scanning device 20, such as a radiation source and a detector array, from being damaged during a movement of the vehicle 10. Furthermore, the locking portion 72 moves in an axis direction of the slip ring and exerts a pressing force in the axial direction of the slip ring 4 by pulling or pushing, so as to prevent the slip ring 4 from rotating relative to the upright framework 3. FIG. 5 shows an embodiment of disposing three locking mechanisms 7. In this way, the three locking mechanisms may uniformly exert pressing forces to the slip ring, but embodiments of the present disclosure are not limited to this. Two, four or five locking mechanisms, or even one locking mechanism may be disposed as desired.

In an exemplary embodiment, with reference to FIGS. 5, 9 to 12, each locking portion 7 includes a moving rod 721 connected to the driving mechanism 71. An end of the moving rod 721 away from the driving mechanism 71 is provided with a suspension portion 7211 protruding radially. The suspension portion 7211 is used to pull the slip ring 4 in an axial direction, so as to prevent the slip ring 4 from rotating relative to the upright framework 3. In an alternative embodiment, the suspension portion 7211 is used to push the slip ring 4 in the axial direction, so as to prevent the slip ring 4 from rotating relative to the upright framework 3.

In an exemplary embodiment, with reference to FIGS. 5, 9 to 12, at least one joint portion 41 extending from an outer ring of the slip ring 4 in a radial direction is provided on the slip ring 4. The suspension portion 7211 of the moving rod 721 pulls the joint portion 71 in the axial direction. Furthermore, a locking groove 411 is formed on the joint portion 71 and has an opening in a circumferential direction of the slip ring 4, and a width of the locking groove 411 is greater than an outer diameter of the moving rod 721, so as to allow the moving rod 721 to move in or out of the locking groove 411 in the circumferential direction. The locking groove 411 has a shape of substantial "C". The suspension portion 7211 is formed as a locking flange, and an outer diameter of the locking flange is greater than the width of the locking groove 411. In this way, the moving rod 721 is allowed to enter the locking groove 411 from the opening, and the locking flange abuts against an edge of the locking groove 411, thereby tightly pulling the joint portion 41.

In an exemplary embodiment, with reference to FIGS. 5, 9 to 12, the driving mechanism 71 includes a base 711 provided on the upright framework 3; and a driver 712 provided on the base 711, where the moving rod 721 is used to reciprocate linearly in the axial direction under a driving of the driver 712. Furthermore, the driving mechanism further includes an auxiliary base 713 and a supporting frame 714. The auxiliary base 713 is provided on the base 711 and used to reciprocate linearly in the axial direction, where the driver 712 is provided on the auxiliary base 713. The moving rod 721 may movably pass through the supporting frame 714, so as to stably reciprocate through the supporting frame 714.

In an exemplary embodiment, the auxiliary base 713 is slidingly engaged with the base 711. The auxiliary base is provided on the base 711 through a guide rail mechanism. For example, the guide rail mechanism includes: a guide rail 7111 disposed on the base 711, and a plurality of sliding blocks 7132 disposed on the auxiliary base 713 and slidingly engaged with the guide rail 7111. The driver 712 stably moves linearly relative to the fixed base 711 while being carried by the auxiliary base 713.

In an exemplary embodiment, with reference to FIGS. 5, 9 to 12, the base 711 is provided with a termination position 715. A movement range of the auxiliary base 713 away from the slip ring 4 does not exceed the termination position 715. The driving mechanism 712 further includes a resilient mechanism 716 provided between the auxiliary base 713 and the supporting frame 714. When the slip ring 4 is in a released state in which the suspension portion 7211 releases the slip ring 4, the resilient mechanism 716 is used to maintain the auxiliary base 713 at the termination position 715, and when the slip ring 4 is in a locked state in which the suspension portion 7211 locks the slip ring 4, the auxiliary base 713 overcomes a resilient force of the resilient mechanism 716 to leave the termination position 715.

FIG. 13 shows a simplified schematic diagram of a locking mechanism in an unlocked state. FIG. 14 is a simplified schematic diagram showing that a moving rod of the locking mechanism extends into a locking groove of a joint portion based on FIG. 13. FIG. 15 is a simplified schematic diagram showing that the moving rod of the locking mechanism is about to tightly pull the joint portion based on FIG. 14. FIG. 16 is a simplified schematic diagram showing that the moving rod of the locking mechanism tightly pulls the joint portion and locks a slip ring based on FIG. 15.

With reference to FIGS. 13 to 16, it may be understood that the released state of the slip ring 4 refers to a state in which the slip ring 4 may be allowed to rotate. In the released state of the slip ring 4, the auxiliary base 713 is maintained at the termination position 715. The moving rod 721 may be in a retracted state without entering the locking groove 411 as shown in FIG. 13, or may be in a flexible extension state in which the locking groove 411 is entered but the suspension portion 7211 is not tightly pulling the slip ring as shown in FIG. 14. The locked state of the slip ring 4 refers to a state in which the slip ring 4 may be prevented from rotating. As shown in FIG. 16, the moving rod 721 enters the locking groove 411, and the driver 712 drives the moving rod 721 to contract. The suspension portion 7211 abuts against an edge of the locking groove 411, so that the driver 712 overcomes a resilient force of the resilient mechanism 716 to move towards the slip ring and leave the termination position 715.

In an exemplary embodiment, with reference to FIGS. 5, 9 to 12, a first proximity switch 7151 is provided at the termination position 715, and a first matching switch 7131 is provided on the auxiliary base 713, so as to detect whether the first matching switch 7131 leaves the first proximity switch 7151 or not. As shown in FIG. 16, in the locked state, the driver 712 overcomes the resilient force of the resilient mechanism 716 and moves towards the slip ring and leaves the termination position 715. In this case, a pulling force of the suspension portion 7211 pulling the joint portion 41 corresponds to the resilient force of the resilient mechanism 716. In this way, the resilient force of the resilient mechanism 716 is used to maintain a flexible contact between the suspension portion 7211 and the slip ring 4, thereby avoiding a damage to the slip ring 4.

In an exemplary embodiment, with references to FIGS. 5, 13 to 16, the upright framework 3 is provided with a second matching switch 31, and the slip ring 4 is provided with a second proximity switch 44. The driver 712 is used to drive the moving rod to lock the slip ring in response to the second proximity switch 44 approaching the second matching switch 31.

In an exemplary embodiment, with reference to FIGS. 5, 13 to 16, the slip ring 4 is further provided with a third proximity switch 43. The third proximity switch 43 is disposed at a downstream of the second proximity switch 44 in a forward rotation direction of the slip ring 4, and a position of the third proximity switch 43 corresponds to a position near an exterior of the opening of each locking groove 41.

In an exemplary embodiment, with reference to FIGS. 5, 13 to 16, the slip ring 4 is further provided with a fourth proximity switch 42. The fourth proximity switch 42 is disposed at a downstream of the third proximity switch 43 in the forward rotation direction of the slip ring 4, and the locking mechanism 7 is used to start a locking process for locking the slip ring 4 in response to the fourth proximity switch 42 approaching the second matching switch 31.

FIG. 20 shows a flowchart of an operation of a locking mechanism locking a slip ring.

The following describes an operation process of locking the slip ring 4 by using the locking mechanism 7 with reference to FIGS. 13 to 16 and 20.

With reference to FIGS. 13 and 20, when the scanning device 20 is idle, it is required to lock the slip ring 4, so as to prevent a further rotation of the slip ring. In this case, in step S110, a controller issues a control command to start the locking process. In step S120, the slip ring 4 rotates forward (clockwise) at a low speed, while the moving rod 721 maintains in a retracted state, so as to not affect the rotation of the slip ring.

Then, with reference to FIGS. 13, 14, and 20, in step S130, when the second matching switch 31 detects that the fourth proximity switch 42 is triggered, the slip ring 4 starts to stop rotating. Due to an inertia of the rotation of the slip ring, a final stop position of the slip ring at this stage is further away. For example, if the third proximity switch 43 is triggered by the second matching switch 31 before the slip ring 4 stops rotating, it indicates that the moving rod 721 is approaching the joint portion. Due to a limitation of the suspension portion 7211, the moving rod 721 cannot enter the locking groove 411 of the joint portion.

In this way, before the driver 712 drives the moving rod 721 to extend, it is required to perform step S140. In step S140, the controller determines whether the third proximity switch 43 is triggered or not during a process of stopping the rotation of the slip ring 4. If it is determined in step S140 that the third proximity switch 43 is triggered, it indicates that the moving rod 721 is approaching the joint portion before the slip ring 4 stops rotating. Therefore, the process is returned to step S120.

If it is determined in step S140 that the third proximity switch 43 is not triggered, it indicates that the moving rod 721 is not approaching the joint portion 41 before the slip ring 3 stops rotating, and step S150 is performed. In step S150, the controller controls the driver 712 to drive the moving rod 721, so as to cause the moving rod 721 to fully extend. As shown in FIG. 14, during an extension of the moving rod, due to the resilient force of the resilient mechanism 716, the driver 712 remains at an initial termination position 715.

After the moving rod 721 is fully extended, step S160 is performed. In step S160, the slip ring 4 moves again, and the third proximity switch 43 approaches the second matching switch 31 and the third proximity switch 43 is triggered. Afterwards, the moving rod 721 enters the locking groove 411 of the joint portion 41. When the moving rod 721 enters a bottom of the locking groove 411, the second matching switch 31 is about to trigger the second proximity switch 44.

During a process of performing step S160, the moving rod is in a fully extended state. Due to the inertia of the rotation of the slip ring, the moving rod entering the locking groove 411 of the joint portion may hit the bottom of the locking groove 411, so that the slip ring is hit to rotate in a reverse direction and the moving rod 721 is located outside the locking groove. If the moving rod 721 is retracted, the suspension portion 7211 of the moving rod may not abut against the edge of the locking groove.

Therefore, before the driver 712 drives the moving rod 721 to retract, it is required to perform step S170. In step S170, the controller determines, during the process of stopping the rotation of the slip ring 4, whether the third proximity switch 43 is triggered due to the reverse rotation of the slip ring 4 caused by the hit of the moving rod 721 on the bottom of the locking groove. If it is determined in step S170 that the third proximity switch 43 is triggered again after the second proximity switch 44 is triggered, it indicates that, before the slip ring 4 stops rotating, the moving rod 721 leaves the locking groove 411 due to the reverse rotation of the slip ring. Therefore, the process is returned to step S160.

If it is determined in step S170 that the third proximity switch 43 is not triggered, it indicates that the moving rod 721 is located in the locking groove 411 after the slip ring 4 stops rotating, and step S180 is performed.

With reference to FIG. 15, in step S180, the controller controls the driver 712 to drive the moving rod 721, so as to cause the moving rod 721 to retract. As shown in FIG. 16, during a retraction of the moving rod, the suspension portion 7211 abuts against the edge of the locking groove 411. Due to the resilient force of the resilient mechanism 716, the resilient mechanism 716 is compressed to trigger a switch 7151, and the driver 712 will move towards the slip ring, so that the driver 712 leaves the initial termination position 715. The driver 712 stops after retracting to a shortest position. As a result, the slip ring 3 maintains in the locked state.

FIG. 17 is a simplified schematic diagram showing that the moving rod of the locking mechanism releases the joint portion based on FIG. 16. FIG. 18 is a simplified schematic diagram showing that the moving rod of the locking mechanism moves out of a locking groove of the joint portion and is in an unlocked state based on FIG. 17. FIG. 19 is a simplified schematic diagram showing that the slip ring rotates freely in the unlocked state based on FIG. 18. FIG. 21 shows a flowchart of an operation of a locking mechanism unlocking a slip ring.

The following describes an operation process of unlocking the slip ring 4 by using the locking mechanism 7 with reference to FIGS. 17 to 19 and 21.

With reference to FIGS. 17 and 21, before the scanning device 20 is driven to operate, it is required to release the locking mechanism 7 from locking the slip ring 4, so as to allow the slip ring to rotate. In this case, in step S210, the controller issues a control command to start an unlocking process. In step S220, the driver 712 drives the moving rod to extend to a maximum position, and the suspension portion 7211 leaves the edge of the locking groove 411, so as to allow the slip ring to rotate.

Afterwards, step S230 is performed, the controller controls the slip ring 4 to rotate in a reverse direction (counterclockwise) at a low speed. With the reverse rotation of the slip ring 4, after the second matching switch 31 triggers the third proximity switch 43, the moving rod 721 completely leaves the locking groove 411. Then, step S240 is performed, the third proximity switch 43 is triggered by the second matching switch 31, and the slip ring 4 gradually stops rotating.

During a process of performing steps S230 and S240, due to the inertia of the rotation of the slip ring, a final stop position of the slip ring at this stage is relatively backward. For example, after the third proximity switch 43 is triggered and before the slip ring 3 stops rotating in the reverse direction, the fourth proximity switch 42 is triggered by the second matching switch 31. If the slip ring 4 continues to rotate in the reverse direction, a non-retracted moving rod is about to hit another joint portion 41, thereby causing a damage to the joint portion or the moving rod.

Therefore, before the slip ring 4 stops rotating in the reverse direction, it is required to perform step S250. In step S250, with reference to FIG. 18, the controller determines, during the process of stopping the reverse rotation of the slip ring 4, whether the fourth proximity switch 42 is triggered or not. If it is determined in step S250 that the fourth proximity switch 42 is not triggered, step S260 is performed.

With reference to FIG. 19, in step S260, the moving rod 721 is located between the third proximity switch 43 and the fourth proximity switch 42. The moving rod 721 retracts, and the driver 712 returns to an initial position (i.e., moves to the termination position 715), so as to implement the unlocking of the slip ring 4 and allow the slip ring 4 to move freely.

If it is determined in step S250 that the fourth proximity switch 42 is triggered, step S270 is performed. In step S270, the controller controls the slip ring 4 to rotate in a forward direction (clockwise) at a low speed. Afterwards, step S280 is performed. After the fourth proximity switch 42 is triggered again, the slip ring 4 stops rotating in the forward direction.

Afterwards, step S290 is performed to determine, during the process of stopping the forward rotation of the slip ring, whether the third proximity switch 43 is triggered or not. If it is determined in step S290 that the third proximity switch 43 is triggered, then the moving rod 721 enters the locking groove 411 again as the slip ring 4 continues to rotate in the forward direction. Then, step S230 is performed.

If it is determined in step S290 that the third proximity switch 43 is not triggered, it indicates that the moving rod 721 is located between the third proximity switch 43 and the fourth proximity switch 42, then step S260 is performed.

With reference to FIGS. 1 to 8, according to embodiments of another aspect of the present disclosure, a vehicle-mounted security inspection system 100 is provided, including a vehicle 10 and a radiographic inspection apparatus 200 described in any of the above embodiments provided on the vehicle 10.

In an exemplary embodiment, with reference to FIGS. 1 to 8, a chassis 101 of the vehicle 10 includes: a main body portion 1 placed horizontally; and a horizontal framework 2 integrally connected with the main body portion 1. The horizontal framework 2 includes a pair of longitudinal supporting beams 21 disposed in a travelling direction of the vehicle and a pair of lateral supporting frames 22. The pair of longitudinal supporting beams 21 and the pair of lateral supporting frames 22 define a substantially rectangular accommodation space 23. The upright framework 3 is provided on the lateral supporting beam 22. At least part of the upright framework 3 is lower than an upper surface of the horizontal framework 2. That is to say, at least part of a lower portion of the upright framework 3 is accommodated in the accommodation space 23.

According to the vehicle-mounted security inspection system 100 of embodiments of the present disclosure, as at least part of the upright framework 3 is lower than the upper surface of the horizontal framework 2, a conveying structure 30 of the radiographic inspection apparatus for conveying the object 40 to be inspected is also lowered accordingly, thereby facilitating relevant personnel to place the object 40 to be inspected on the conveying structure 30 or take out the inspected object 40 from the conveying structure 30. In addition, as a height of the slip ring 4 is also reduced accordingly, it is possible to improve stabilities of a radiation source and a detector array provided on the slip ring.

In an exemplary embodiment, the upright framework 3 is provided on the horizontal framework 2 through two groups of connecting mechanisms 5. Each group of connecting mechanisms 5 includes a horizontal arm 51 extending outward from an outer side of the upright framework 3 and supported on the lateral supporting frame 22.

In an exemplary embodiment, each group of connecting mechanisms 5 also includes: an upright arm 52 provided on the outer side of the upright framework 3. The horizontal arm 51 is connected to a lower end of the upright arm 52. In this way, it is possible to increase a supporting strength of the horizontal arm 51. Furthermore, each group of connecting mechanisms 5 includes a plurality of reinforcing ribs 53 connected between the upright arm 52 and the horizontal arm 51, so as to further increase the supporting strength of the horizontal arm 51. A backing plate 54 may be pre-welded on the lateral supporting beam 22 of the horizontal framework 2, so as to increase a supporting strength of the lateral supporting beam 22. For example, the horizontal arm 51 of the connecting mechanism 5 may be fixed to the lateral supporting beam 22 by means of a bolt assembly.

In an exemplary embodiment, with reference to FIGS. 1 to 8, the two groups of connecting mechanisms 5 are provided on both sides of the upright framework 3, respectively, and located between a lower end of the upright framework 3 and an upper end of the upright framework 3, so that at least part of the upright framework 3 is lower than an upper surface of the horizontal framework 2. That is to say, at least part of the lower portion of the upright framework 3 is accommodated in the accommodation space 23. As at least part of the upright framework 3 is lower than the upper surface of the horizontal framework 2, the conveying structure 30 of the radiographic inspection apparatus for conveying the object 40 to be inspected is also lowered accordingly, thereby facilitating relevant personnel to place the object 40 to be inspected on the conveying structure 30 or take out the inspected object 40 from the conveying structure 30. In addition, as a height of the slip ring 4 is also reduced accordingly, it is possible to increase and improve stabilities of the radiation source and the detector array provided on the slip ring.

According to an exemplary embodiment of the present disclosure, as shown in FIGS. 3 and 6, a height of the main body portion 1 of the chassis from a ground is greater than a height of the horizontal framework 2 from the ground. In this way, it is possible to further reduce the height of the inspection apparatus from the ground.

According to an exemplary embodiment of the present disclosure, as shown in FIG. 5, a level sensor 8 is provided on the upright framework 3. In this way, the level sensor 8 may be used to more accurately measure a placement posture of the scanning device 20.

According to an exemplary embodiment of the present disclosure, the vehicle 10 further includes a plurality of supporting legs 6 provided on the chassis 101. Each supporting leg 6 is in a retracted state of retracting towards the chassis 101 or in an expanded state of extending towards the ground to support a weight of the vehicle 10.

According to an exemplary embodiment of the present disclosure, as shown in FIGS. 1 to 8, and as shown in FIGS. 2 to 8, the vehicle-mounted security inspection system 100 also includes a level sensor 8 and a controller. The level sensor 8 is used to detect a levelness of the scanning device 20. The controller is used to adjust an expansion degree of at least one of the plurality of supporting legs 6 according to the levelness measured by the level sensor 8, so that the scanning device 20 remains in a predetermined posture. In an embodiment, the level sensor 8 is provided on a horizontal mounting surface applicable to mount the lateral supporting beam 22 of the upright framework 3, and/or is provided on the upright framework 3.

In the present disclosure, a technical term "predetermined posture" refers to an optimal placement posture of the scanning device with optimal measurement accuracy. For example, the optimal placement posture may be a posture that the scanning device presents when the scanning device is placed on a horizontal plane. A plane of a circumference of the slip ring of the scanning device is perpendicular to the horizontal plane, and a virtual rotation axis of the slip ring is parallel to the horizontal plane. The levelness refers to an angle of a mounting surface of a mounting base relative to the horizontal plane, which changes due to an unevenness of the ground, in a case that the mounting base of the level sensor is provided in a certain initial posture (reference levelness). Those of ordinary skill in the art understand that there is a fixed correspondence between an initial mounting posture of the level sensor and the optimal placement posture of the scanning device. Therefore, the greater a deviation of the measured levelness from the initial mounting posture (reference levelness), the greater a deviation of a real-time measurement accuracy of the scanning device from the optimal measurement accuracy; conversely, the smaller the deviation of the measured levelness from the initial mounting posture, the smaller the deviation of the real-time measurement accuracy of the scanning device from the optimal measurement accuracy.

According to the vehicle-mounted security inspection system 100 of embodiments of the present disclosure, the controller adjusts an expansion degree of at least one of the plurality of supporting legs according to the levelness measured by the level sensor, so that the scanning device remains in a predetermined posture, that is, the scanning device remains in the optimal placement posture with the optimal measurement accuracy. In this way, no matter how uneven the ground on which the vehicle 10 is parked, a parking posture of the vehicle may be adjusted by adjusting the extension degree of the supporting leg, so that the scanning device remains in the optimal placement posture with the optimal measurement accuracy, thereby improving an inspection accuracy of the radiographic inspection apparatus. Furthermore, the vehicle-mounted security inspection system of the present disclosure may maintain that the slip ring of the scanning device is perpendicular to the horizontal plane in an operation state and the virtual rotation axis of the slip ring is parallel to the horizontal plane, so as to reduce a risk of a damage to the slip ring and improve a service life of the slip ring. In addition, it is possible to ensure the stabilities of the radiation source and the detector array provided on the slip ring.

In an exemplary embodiment, according to a center of gravity of the entire vehicle load and a specific shape of the chassis, two supporting legs located at the front of the vehicle are arranged behind the vehicle exhaust system and a battery of the vehicle, and two supporting legs located at a rear of the vehicle are disposed close to both sides of the horizontal framework for supporting the scanning device. The electrical energy used to control the extension and retraction of the supporting legs may be provided by the battery of the vehicle. According to an actual situation, the controller may control at least one of all supporting legs until all supporting legs perform extension and retraction operations, so as to achieve functions such as a jogging of single supporting leg and automatic leveling of all supporting legs with one button, automatic lowering of all supporting legs with one button, and automatic retraction of all supporting legs with one button. After the vehicle stops in place, the leveling function of the vehicle is started through the controller, and four groups of supporting legs extend outward at the same time. After landing, the expansion degrees of the four groups of supporting legs are fine-tuned according to the levelness measured by the level sensor, so that design requirements of the level of the vehicle are met.

FIG. 22 shows a simplified side view of an interior of a vehicle-mounted security inspection system of another exemplary embodiment of the present disclosure. FIG. 23 shows a top view of the vehicle-mounted security inspection system shown in FIG. 22. FIG. 24 shows a three-dimensional schematic diagram of a chassis of the vehicle-mounted security inspection system shown in FIG. 22. FIG. 25 shows an enlarged schematic diagram of part E shown in FIG. 22.

In an exemplary embodiment, with reference to FIGS. 22 to 25, a chassis of the vehicle 10 includes: a main body portion 1 placed horizontally; and a horizontal framework 2' integrally connected with the main body portion 1. The horizontal framework 2" includes a pair of longitudinal supporting beams 21' disposed in a travelling direction of the vehicle and a pair of lateral supporting frames 22'. The pair of longitudinal supporting beams 21' and the pair of lateral supporting frames 22' define a substantially rectangular accommodation space 23'. The scanning device 20 includes: an upright framework 3; a slip ring 4 rotatably provided on the upright framework 3; and two groups of connecting mechanisms 5 provided on both sides of the upright framework 3 respectively, and located between a lower end of the upright framework 3 and an upper end of the upright framework 3. The connecting mechanism 5 is used to provide the upright framework 3 on the longitudinal supporting beam 21', so that at least part of the upright framework 3 is lower than an upper surface of the horizontal framework 2'. That is to say, at least part of the lower portion of the upright framework 3 is accommodated in the accommodation space 23'.

Each group of connecting mechanisms 5 includes a horizontal arm 51 extending outward from an outer side of the upright framework 3 and supported on the lateral supporting beam 22'. In an exemplary embodiment, each group of connecting mechanisms 5 further includes: an upright arm 52 provided on the outer side of the upright framework 3. The horizontal arm 51 is connected to a lower end of the upright arm 52. In this way, it is possible to increase a supporting strength of the horizontal arm 51. Furthermore, each group of connecting mechanisms 5 includes a plurality of reinforcing ribs 53 connected between the upright arm 52 and the horizontal arm 51, so as to further increase the supporting strength of the horizontal arm 51. A backing plate 54 may be pre-welded on the longitudinal supporting beam 21' of the horizontal framework 2', so as to increase a supporting strength of the longitudinal supporting beam 21'. For example, the horizontal arm 51 of the connecting mechanism 5 may be fixed to the longitudinal supporting beam 21' by means of a bolt assembly.

In embodiments shown in FIGS. 22 to 25, the level sensor may be provided on the upright framework 3 and/or the longitudinal supporting beam 21'.

According to the radiographic inspection apparatus and the vehicle-mounted security inspection system of embodiments of the present disclosure, when the radiographic inspection apparatus is in an idle state while the vehicle is travelling, the locking mechanism automatically lock the slip ring to prevent the slip ring from rotating, so as to prevent key components of the scanning device such as a radiation source and a detector array from being damaged during a movement of the vehicle. Furthermore, through a frictional force generated by a close contact between the locking portion and the outer ring of the slip ring in a radial direction, the slip ring is prevented from rotating relative to the upright framework. The locking mechanism may lock the slip ring at any time, and is not limited by a specific position of the slip ring, thereby improving a flexibility of braking the slip ring.

It may be understood by those of ordinary skill in the art that the above-described embodiments are exemplary, and those of ordinary skill in the art may improve them. The structures described in various embodiments may be combined freely in terms of structures or principles not conflicting with each other.

Although the present disclosure has been described with reference to accompanying drawings, embodiments disclosed in the accompanying drawings are intended to illustrate optional embodiments of the present disclosure, and should not be construed as a limitation of the present disclosure. Although embodiments of the present disclosure have been illustrated and described, it may be understood by those of ordinary skill in the art that these embodiments may be changed without departing from the principle and spirit of the present disclosure. The scope of the present disclosure is defined by the appended claims and their equivalents.

What is claimed is:

1. A radiographic inspection apparatus, comprising a scanning device, wherein the scanning device comprises:
  an upright framework;
  a slip ring rotatably provided on the upright framework; and
  at least one locking mechanism, each locking mechanism comprising:
    a driving mechanism provided on the upright framework; and
    a locking portion provided on the driving mechanism and configured to move in an axial direction of the slip ring under a driving of the driving mechanism, and apply a pressing force in the axial direction of the slip ring by pulling, so as to prevent the slip ring from rotating relative to the upright framework,
    wherein each locking portion comprises: a moving rod connected to the driving mechanism, wherein an end of the moving rod away from the driving mechanism is provided with a suspension portion, and the suspension portion protrudes radially and is configured to pull the slip ring in the axial direction,
    wherein the slip ring is provided with at least one joint portion, and the at least one joint portion extends from an outer ring of the slip ring in a radial direction, and the suspension portion of the moving rod is configured to pull the joint portion in the axial direction,
    wherein a locking groove is formed on the joint portion and has an opening in a circumferential direction of the slip ring, and a width of the locking groove is greater than an outer diameter of the moving rod, and
    wherein the suspension portion is formed as a locking flange, and an outer diameter of the locking flange is greater than the width of the locking groove, so that the moving rod is allowed to enter the locking groove from the opening, and the locking flange abuts against an edge of the locking groove.

2. The radiographic inspection apparatus of claim 1, wherein the driving mechanism comprises:
  a base provided on the upright framework; and
  a driver provided on the base, wherein the moving rod is configured to reciprocate linearly in the axial direction under a driving of the driver.

3. The radiographic inspection apparatus of claim 2, wherein the driving mechanism further comprises:
  an auxiliary base provided on the base and configured to reciprocate linearly in the axial direction, wherein the driver is provided on the auxiliary base; and
  a supporting frame, wherein the moving rod movably passes through the supporting frame.

4. The radiographic inspection apparatus of claim 3, wherein the base is provided with a termination position, and a movement range of the auxiliary base away from the slip ring does not exceed the termination position,
  wherein the driving mechanism further comprises a resilient mechanism provided between the auxiliary base and the supporting frame, and
  wherein when the slip ring is in a released state in which the suspension portion releases the slip ring, the resilient mechanism is configured to maintain the auxiliary base at the termination position, and when the slip ring is in a locked state in which the suspension portion locks the slip ring, the auxiliary base overcomes a resilient force of the resilient mechanism to leave the termination position.

5. The radiographic inspection apparatus of claim 4, wherein a first proximity switch is provided at the termination position, and a first matching switch is provided on the auxiliary base, so as to detect whether the first matching switch leaves the first proximity switch or not.

6. The radiographic inspection apparatus of claim 5, wherein the upright framework is provided with a second matching switch, the slip ring is provided with a second proximity switch, and the driver is configured to drive the moving rod to lock the slip ring in response to the second proximity switch approaching the second matching switch.

7. The radiographic inspection apparatus of claim 6, wherein the slip ring is further provided with a third proximity switch, the third proximity switch is disposed at a downstream of the second proximity switch in a forward rotation direction of the slip ring, and a position of the third proximity switch corresponds to a position near an exterior of the opening of each locking groove.

8. The radiographic inspection apparatus of claim 7, wherein the slip ring is further provided with a fourth proximity switch, the fourth proximity switch is disposed at a downstream of the third proximity switch in the forward rotation direction of the slip ring, and the locking mechanism is configured to start a locking process for locking the slip ring in response to the fourth proximity switch approaching the second matching switch.

9. The radiographic inspection apparatus of claim 3, wherein the auxiliary base is provided on the base through a guide rail mechanism.

10. A vehicle-mounted security inspection system, comprising:
  a vehicle; and
  a radiographic inspection apparatus of claim 1 provided on a chassis of the vehicle.

11. The vehicle-mounted security inspection system of claim 10, wherein the chassis comprises:
  a main body portion; and
  a horizontal framework integrally connected with the main body portion, wherein the horizontal framework comprises a pair of longitudinal supporting beams and a pair of lateral supporting beams, the upright framework is provided on one of the longitudinal supporting beam or the lateral supporting beam, and at least part of the upright framework is lower than an upper surface of the horizontal framework.

12. The vehicle-mounted security inspection system of claim 11, wherein the upright framework is provided on the horizontal framework through two groups of connecting mechanisms,
  each group of connecting mechanisms comprises a horizontal arm extending outward from an outer side of the upright framework and supported on the longitudinal supporting beam or the lateral supporting beam.

13. The vehicle-mounted security inspection system of claim 12, wherein each group of connecting mechanisms further comprises an upright arm provided on the outer side of the upright framework, and the horizontal arm is connected to a lower end of the upright arm.

14. The vehicle-mounted security inspection system of claim 12, wherein the two groups of connecting mechanisms are provided on both sides of the upright framework, respectively, and located between a lower end of the upright framework and an upper end of the upright framework, so that at least part of the upright framework is lower than an upper surface of the horizontal framework.

15. The vehicle-mounted security inspection system of claim 11, wherein a height of the main body portion from a ground is greater than a height of the horizontal framework from the ground.

* * * * *